United States Patent
Xiao et al.

(10) Patent No.: US 9,011,815 B2
(45) Date of Patent: Apr. 21, 2015

(54) ORGANOTEMPLATE-FREE SYNTHETIC PROCESS FOR THE PRODUCTION OF A ZEOLITIC MATERIAL

(71) Applicants: Feng-Shou Xiao, Changchun (CN); Bin Xie, Changchun (CN); Ulrich Mueller, Neustadt (DE); Bilge Yilmaz, Mannheim (DE)

(72) Inventors: Feng-Shou Xiao, Changchun (CN); Bin Xie, Changchun (CN); Ulrich Mueller, Neustadt (DE); Bilge Yilmaz, Mannheim (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/654,074

(22) Filed: Oct. 17, 2012

(65) Prior Publication Data

US 2013/0045860 A1 Feb. 21, 2013

Related U.S. Application Data

(62) Division of application No. 12/486,983, filed on Jun. 18, 2009, now Pat. No. 8,865,121.

(51) Int. Cl.
*C01B 39/46* (2006.01)
*B01J 29/70* (2006.01)
(Continued)

(52) U.S. Cl.
CPC ............. *B01J 29/7007* (2013.01); *B01D 53/02* (2013.01); *B01D 53/9413* (2013.01); *B01D 2251/2062* (2013.01); *B01D 2251/2067* (2013.01); *B01D 2255/20738* (2013.01); *B01D 2255/502* (2013.01); *B01D 2257/402* (2013.01);
(Continued)

(58) Field of Classification Search
USPC .................................................. 423/709, 718
See application file for complete search history.

(56) References Cited

U.S. PATENT DOCUMENTS

| 5,106,801 A | 4/1992 | Zones et al. |
| 5,110,570 A | 5/1992 | Bellussi et al. |

(Continued)

FOREIGN PATENT DOCUMENTS

| CN | 1735451 A | | 2/2006 |
| CN | 101249968 A | * | 8/2008 |

(Continued)

OTHER PUBLICATIONS

Reddy et al, "Physicochemical Characterization of Boro- and Gallo-Silicate Isomorphs of B-Zeolite", J. Incl. Phenomena and Molecular Recognition in Chemistry, vol. 20, pp197-210, (1995).*

(Continued)

*Primary Examiner* — David M Brunsman
(74) *Attorney, Agent, or Firm* — Oblon, McClelland, Maier & Neustadt, L.L.P.

(57) ABSTRACT

The present invention relates to an organotemplate-free synthetic process for the production of a zeolitic material having a BEA framework structure comprising $YO_2$ and optionally comprising $X_2O_3$, wherein said process comprises the steps of (1) preparing a mixture comprising seed crystals and at least one source for $YO_2$; and (2) crystallizing the mixture; wherein Y is a tetravalent element, and X is a trivalent element, wherein the zeolitic material optionally comprises at least one alkali metal M, wherein when the BEA framework additionally comprises $X_2O_3$, the mixture according to step (1) comprises at least one source for $X_2O_3$, and wherein the seed crystals comprise zeolitic material having a BEA framework structure, preferably zeolite Beta.

22 Claims, 18 Drawing Sheets

(51) Int. Cl.
- B01J 29/74 (2006.01)
- B01J 29/76 (2006.01)
- B01J 29/78 (2006.01)
- B01J 29/88 (2006.01)
- B01J 35/00 (2006.01)
- B01J 35/04 (2006.01)
- B01J 35/10 (2006.01)
- C10G 11/05 (2006.01)
- C10G 11/18 (2006.01)
- B01D 53/02 (2006.01)
- B01D 53/94 (2006.01)
- B01J 29/18 (2006.01)
- B01J 37/00 (2006.01)

(52) U.S. Cl.
CPC ..... B01D2257/404 (2013.01); B01D 2257/406 (2013.01); B01D 2257/702 (2013.01); B01D 2257/80 (2013.01); B01J 29/18 (2013.01); B01J 29/7415 (2013.01); B01J 29/7615 (2013.01); B01J 29/7815 (2013.01); B01J 29/88 (2013.01); B01J 35/002 (2013.01); B01J 35/04 (2013.01); B01J 35/1019 (2013.01); B01J 35/1023 (2013.01); B01J 37/0009 (2013.01); C01B 39/46 (2013.01); C10G 11/05 (2013.01); C10G 11/18 (2013.01); Y02C 20/10 (2013.01); B01D 53/94 (2013.01); C10G 2300/405 (2013.01)

(56) References Cited

U.S. PATENT DOCUMENTS

| | | |
|---|---|---|
| 5,171,556 A | 12/1992 | Caullet et al. |
| 5,389,358 A | 2/1995 | Wu et al. |
| 5,648,558 A | 7/1997 | Hatano et al. |
| 6,153,806 A | 11/2000 | Gajda |
| 6,409,986 B1 | 6/2002 | Camblor Fernandez et al. |
| 6,471,941 B1 | 10/2002 | Boix et al. |
| 6,733,742 B1 | 5/2004 | Elomari |
| 6,787,124 B2 * | 9/2004 | Chester et al. ........... 423/718 |
| 6,787,127 B2 | 9/2004 | DiGiulio |
| 6,896,869 B2 | 5/2005 | Corma Canos et al. |
| 6,916,459 B2 | 7/2005 | Corma Canos et al. |
| 7,056,489 B2 | 6/2006 | Corma Canos et al. |
| 7,449,169 B2 | 11/2008 | Corma Canos et al. |
| 2003/0185751 A1 | 10/2003 | Chester et al. |
| 2007/0259770 A1 * | 11/2007 | Hofmann et al. ........... 502/60 |
| 2008/0261803 A1 * | 10/2008 | Luo et al. ........... 502/74 |
| 2011/0207982 A1 | 8/2011 | Butler |
| 2013/0123096 A1 | 5/2013 | Xiao et al. |

FOREIGN PATENT DOCUMENTS

| | | |
|---|---|---|
| CN | 101249968 A | 8/2008 |
| JP | P2002-160195 | 6/2000 |
| JP | 2002-239346 | 8/2002 |
| JP | 2007-296521 | 11/2007 |
| JP | 2008-542173 | 11/2008 |

OTHER PUBLICATIONS

International Search Report issued Mar. 25, 2010 in PCT/CN2009/072336 filed Jun. 18, 2009.

International Search Report issued Nov. 8, 2010 in PCT/EP2010/058641 filed Jun. 18, 2010.

Bin Xie, et al.; "Organotemplate-Free and Fast Route for Synthesizing Beta Zeolite"; Chem. Mater., 2008, vol. 20, No. 14, pp. 4533-4535.

G. Delahay, et al.; "Selective Catalytic Reduction of Nitrous Oxide by Ammonia on Iron Zeolite Beta Catalysts in an Oxygen Rich Atmosphere: Effect of Iron Contents"; Journal of Catalysts, 2001, vol. 202, No. 1, pp. 156-162.

Gerardo Majano, et al.; "Al-Rich Zeolite Beta by Seeding in the Absence of Organic Template"; Chem. Mater., 2009, vol. 21, No. 18, pp. 4184-4191.

X-Ray diffraction pattern for Zeolite Beta. Downloaded from http://izasc.ethz.ch/6-5-2012.

HKL List for Zeolite Beta. Downloaded from http://izasc.ethz.ch. Jun. 5, 2012.

Chinese Publication CN101249968A, Publication Date Aug. 27, 2008, 19pp. (English Language Translation Previously Submitted on Feb. 1, 2013).

Japanese Office Action, Oct. 16, 2012, with 3pp. English Abstract, received by applicants Nov. 21, 2012.

"The Beta Family", IZA-SC, (2008).

Communication from Mr. Christopher P. Foley of Finnigan, Henderson, Farabow, Garrett & Dunner, LLP, received on Jan. 11, 2013, 2pp.

Supporting information to Xie et al., Chemistry of Materials 2008, vol. 20, No. 14 (five pages).

Office Action issued in corresponding JP Application No. 2012-231436, mailed Jun. 3, 2014 (with English translation).

EPO Communication, Third Party Observation for application No. EP20100726486, Jun. 25, 2014.

* cited by examiner

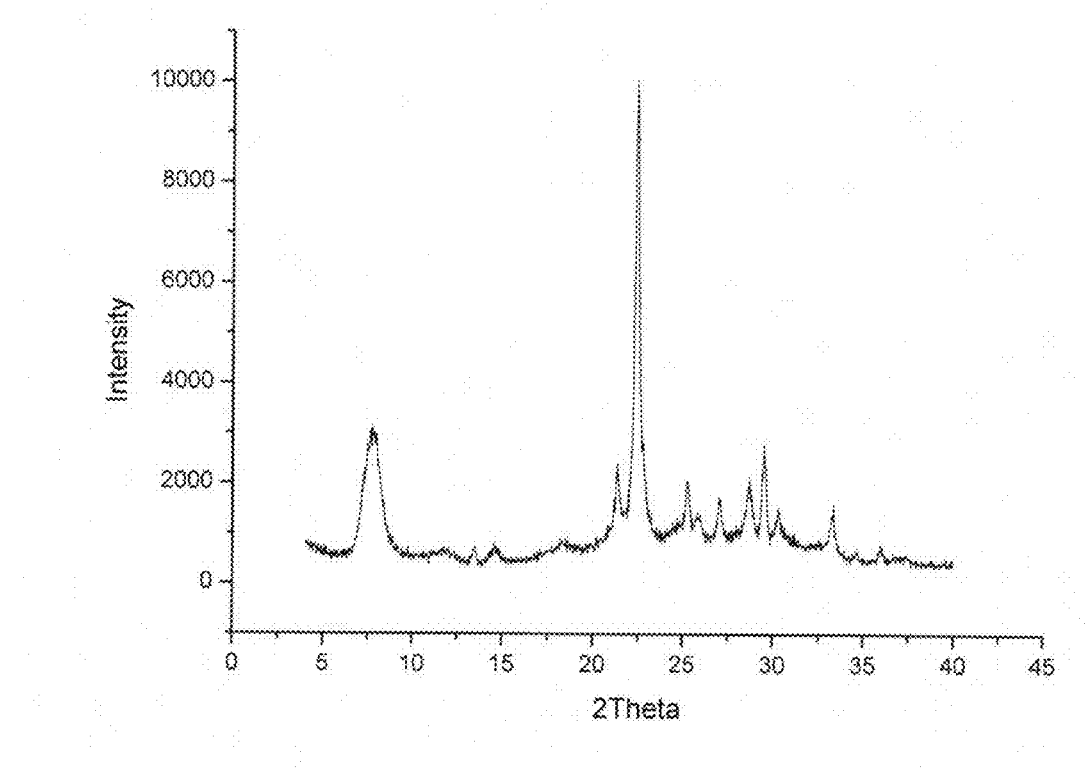

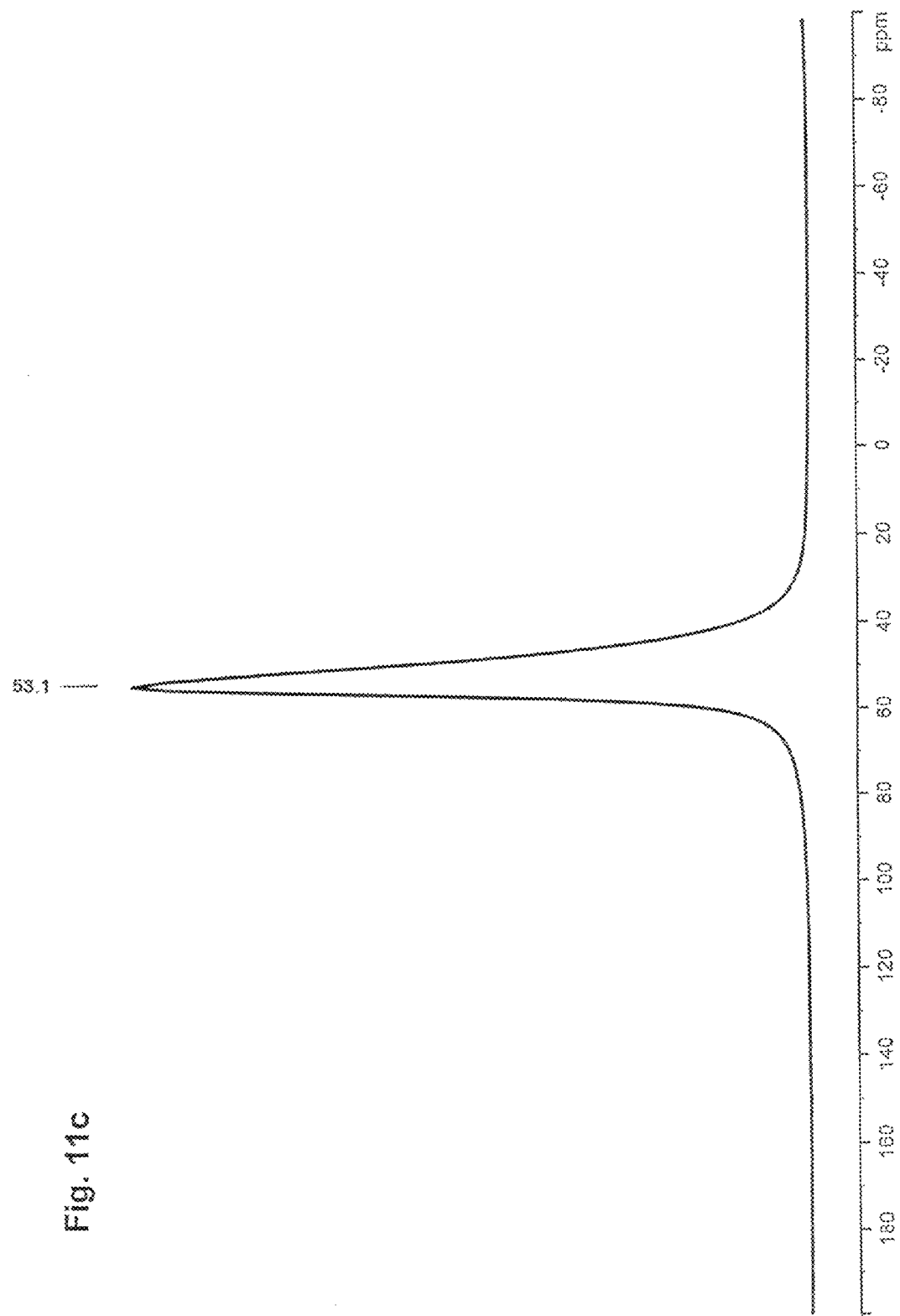

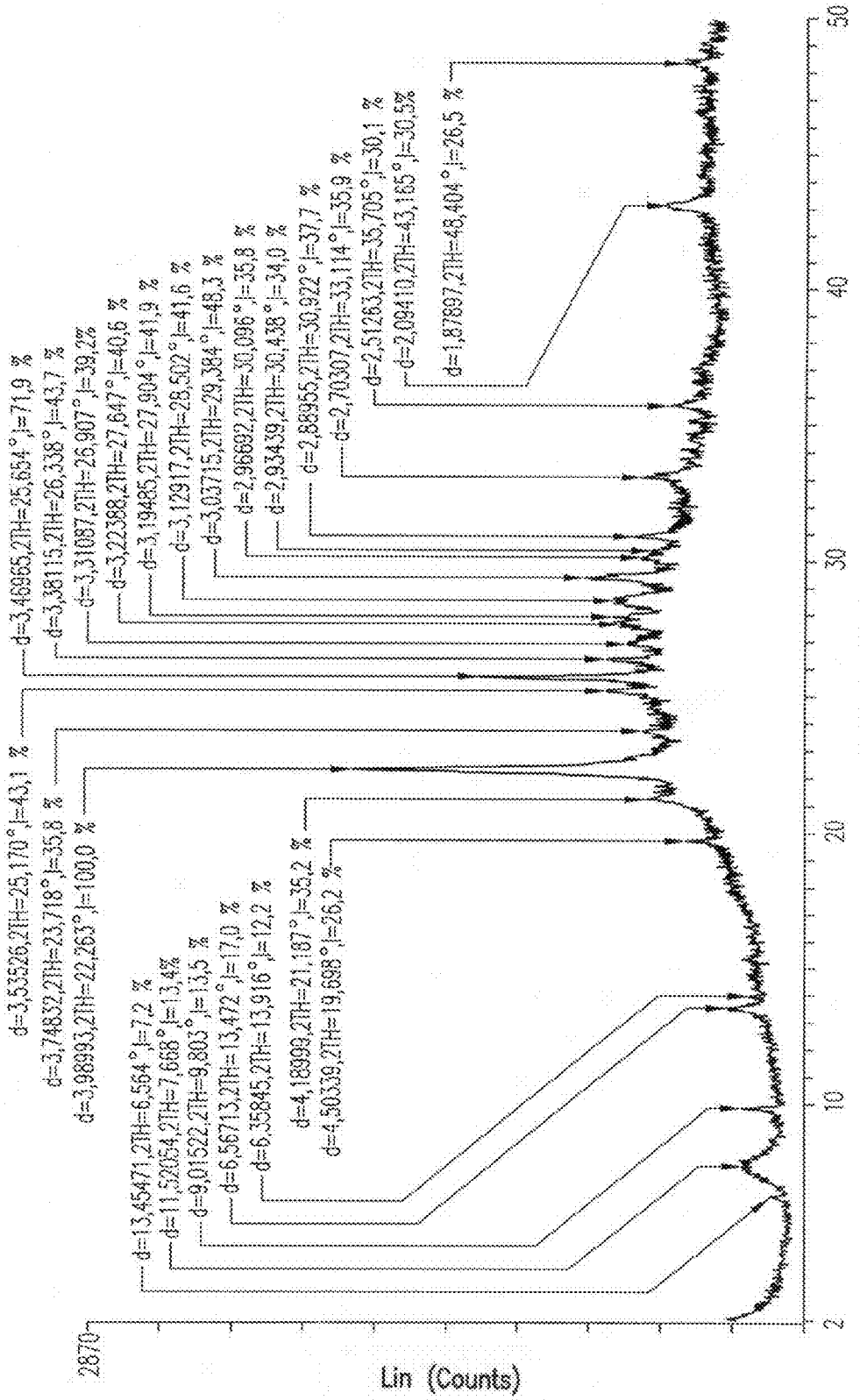

US 9,011,815 B2

ORGANOTEMPLATE-FREE SYNTHETIC PROCESS FOR THE PRODUCTION OF A ZEOLITIC MATERIAL

This application is a divisional application of U.S. Ser. No. 12/486,983 filed on Jun. 18, 2009.

The present invention relates to an organotemplate-free zeolitic material with a BEA framework structure and to a process for the production of said material which does not involve the use of an organotemplate. Furthermore, the present invention relates to the use of an organotemplate-free zeolitic material having a BEA framework structure in a catalytic process and/or in the treatment of exhaust gas.

The most prominent and best studied example for a zeolitic material with a BEA framework structure is zeolite Beta, which is a zeolite containing $SiO_2$ and $Al_2O_3$ in its framework and is considered to be one of the most important nanoporous catalysts with its three-dimensional 12-membered-ring (12MR) pore/channel system and has been widely used in petroleum refining and fine chemical industries. Zeolite Beta was first described in U.S. Pat. No. 3,308,069 and involved the use of the tetraethylammonium cation as the structure directing agent. Although numerous alterations and improvements have been made to the procedure since then, including the use of other structure directing agents such as dibenzyl-1,4-diazabicyclo[2,2,2]octane in U.S. Pat. No. 4,554,145 or dibenzylmethylammonium in U.S. Pat. No. 4,642,226, the known processes for its preparation still relies on the use of organic template compounds. In U.S. Pat. No. 5,139,759, for example, it is reported that the absence of an organic template compound in the synthetic procedure of zeolite Beta leads to the crystallization of ZSM-5 instead.

In the synthesis of specialty zeolites in general, seed crystals are often used as nucleating agents for improving the rate of crystallization, as well as for influencing the size and morphology of the resulting crystals. These, however, need not necessarily be the of same type of zeolite as the products obtained. U.S. Pat. No. 4,650,655, for example, teaches the use of ZSM-11, ZSM-50, or zeolite Beta seed crystals in the synthesis of ZSM-5, in addition to tetrapropylammonium as the structure directing agent.

A first drawback of the known production methods of zeolitic materials having a BEA framework structure such as zeolite Beta concerns the lengthy crystallization periods. U.S. Pat. No. 5,139,759, for example, discloses crystallization periods for zeolite Beta of 72 hours for an unseeded gel, and 66 and 68 hours with seeding. Although the crystallization period can be further shortened by agitation, e.g. by using rotating autoclaves, this involves considerably higher apparatus and maintenance costs and is therefore not feasible on the industrial scale.

Furthermore, the use of organic template compounds in the synthesis of these zeolitic materials possesses the major disadvantage that the tetraalkylammonium salts and other organic compounds employed therein are expensive fine chemicals. In addition to this, the resulting products inevitably contains the organotemplates which are encapsulated in the zeolitic framework created around them, such that a removal step becomes necessary in order to open the porous volume of the material for actual utilization, e.g. in catalysis.

Complete removal of the organic template compound, however, is difficult and is normally only achieved by calcination at higher temperatures, normally at 200-930° C. or even higher. This procedure not only greatly increases the production costs since the organic template is destroyed in the process and may not be recycled, it also further increases the production time results in excess energy consumption, and produces harmful gases and other unwanted waste products.

In addition to these major disadvantages, the harsh thermal treatment ultimately limits the production to thermally stable zeolite Beta, in particular to high-silica zeolite Beta. Although ion-exchange methods have been developed as an environmentally friendly alternative to calcination for removing the organotemplate, only part of the organic templates may successfully be recycled, the remainder interacting too strongly with the zeolite framework for removal.

Thus, although zeolitic materials having a BEA framework structure such as zeolite Beta exhibit excellent properties in a series of catalytic reactions, their further potential applications are still greatly limited due to the use of organic templates in the synthesis thereof.

In Xiao et al. "Organotemplate-free and Fast Route for Synthesizing Beta Zeolite", *Chem. Mater.* 2008, 20, 4533-4535 and Supporting Information, a process for the synthesis of zeolite Beta is described, in which crystallization of an aluminosilicate gel is conducted using zeolite Beta seed crystals. In particular, an aluminosilicate gel is prepared starting from fumed silica as the silica source, sodium hydroxide, sodium aluminate, and water, wherein said gel is then crystallized in an autoclave for 17 to 19 h at a temperature of 140° C. There is, however, no indication whatsoever in said document relating to the use of different starting materials for the preparation of an aluminosilicate gel, nor does said document indicate the possibility of including elements suited for isomorphous substitution in the mixture for crystallization.

It was therefore an object of the present invention to provide a process for the organotemplate-free synthesis of zeolitic material having a BEA framework structure.

It was also an object of the present invention to provide a process for the production of organotemplate-free zeolitic material having a BEA framework structure which can be conducted under mild conditions and is non-destructive towards the zeolite architecture. In particular, it was also an object to provide a process for the production of such materials which does not involve a high-temperature calcination treatment or other treatment for the removal of organotemplates present in the framework structure.

A further object of the present invention was to provide an improved and cost-effective process for the production of organotemplate-free zeolitic materials having a BEA framework structure, in particular with respect to crystallization time, energy consumption, and environmental pollution.

In addition to this, it was also an object of the present invention to provide organotemplate-free zeolitic materials having a BEA framework structure which display an intact architecture as directly obtained from the crystallization process.

A further object of the present invention was to provide novel zeolitic materials having a BEA framework structure, in particular zeolitic materials which can advantageously be employed, for example, as catalysts and/or catalyst supports.

According to the present invention it has surprisingly been found that a zeolitic material having a BEA framework structure can be obtained without using an organotemplate in the synthesis thereof. In particular, it has been found that when using seed crystals of a zeoitic material having a BEA framework structure in the synthetic process, organotemplate-free zeolitic materials having a BEA framework structure can be obtained without having to use an organotemplate in their production. Thus, a one-pot synthetic procedure is provided for directly obtaining a zeolitic material having a BEA framework, wherein the porosity is directly given and must not first be provided by one or more post-synthetic treatments for removing structure directing agents from the crystallized framework.

Furthermore, it has surprisingly been found that besides providing a method for the direct synthesis of an organotemplate-free zeolitic material having a BEA framework structure, the inventive process allows considerable reduction of the crystallization time compared to processes which rely on the use of an organotemplate. Consequently, the inventive process is not only environmentally friendly but also greatly reduces both the time and costs of production.

In addition to these considerable advantages, it has surprisingly been found that according to the inventive process, novel zeolitic materials having a BEA framework structure can be obtained displaying novel properties which can be advantageously utilized in current and novel applications. In particular, BEA frameworks are accessible, of which the chemical composition and/or physical properties thereof may not be obtained by oganotemplate-mediated synthesis. In this respect, it has quite unexpectedly been found that the inventive process can lead to zeolitic materials having a BEA framework structure which are enriched with respect to a particular polymorph compared to the products of synthetic procedures which rely on the use of an organotemplate. Furthermore, in the X-ray powder diffraction pattern of the novel zeolitic materials having a BEA framework structure at least in part of the reflections are noticeably shifted in their 2° Theta values compared to the X-ray powder diffraction pattern of a zeolitic material having a BEA framework structure obtained from an organotemplate-mediated synthetic procedure.

In particular, with respect to a process for the organotemplate-free synthesis of zeolite Beta as described in Xiao et al., it has surprisingly been found that it is possible to incorporate further elements into the mixture for crystallization, thus leading to isomorphous substitution of Si and/or Al in the zeolite framework in a simple one-pot synthetic process. Thus, it has been found that the cost intensive and time consuming steps of isomorphous substitution conducted after the crystallization of zeolite Beta may presently be eliminated in a simple synthetic procedure. In addition to this, the one-pot synthetic procedure according to the present invention avoids any harsh treatment of the zeolite architecture usually inherent to such post-synthetic isomorphous substitution procedures.

Furthermore, it has surprisingly been found that the use of new starting materials as the silica source in an organotemplate-free synthetic procedure may further reduce the crystallization time compared to a procedure as taught in Xiao et al., wherein fumed silica is solely taught as the silica source.

Therefore, the present invention relates to a process for the organotemplate-free synthesis of a zeolitic material having a BEA framework structure comprising $YO_2$ and optionally comprising $X_2O_3$, wherein said process comprises the steps of (1) preparing a mixture comprising seed crystals and at least one source for $YO_2$; and (2) crystallizing the mixture, wherein Y is a tetravalent element, and X is a trivalent element, wherein the zeolitic material optionally comprises at least one alkali metal M, wherein when the BEA framework additionally comprises $X_2O_3$, the mixture according to step (1) comprises at least one source for $X_2O_3$, and wherein the seed crystals comprise zeolitic material having a BEA framework structure, preferably zeolite Beta.

According to the inventive process, at no point does the mixture provided in step (1) and crystallized in step (2) contain more than an impurity of an organic structure directing agent specifically used in the synthesis of zeolitic materials having a BEA framework structure, in particular specific tetraalkylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the inventive process. Organotemplates contained in seed crystal material may not, however, participate in the crystallization process since they are trapped within the seed crystal framework and therefore may not act structure directing agents within the meaning of the present invention.

Furthermore, $YO_2$ and optionally $X_2O_3$ are comprised in the BEA framework structure as structure building elements, as opposed to non-framework elements which can be present in the pores and cavities formed by the framework structure and typical for zeolitic materials in general.

According to the present invention, a zeolitic material having a BEA framework structure is provided in step (2). Said material comprises $YO_2$, wherein Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, according to the process of the present invention $YO_2$ can be provided in step (1) in any conceivable form, provided that a zeolitic material having a BEA framework structure comprising $YO_2$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements, the source for $SiO_2$ provided in step (1) can be any conceivable source. There can therefore be used, for example, all types of silica and silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds.

In preferred embodiments of the inventive process, wherein the mixture according to step (1) comprises at least one source for $SiO_2$, said source preferably comprises at least one compound selected from the group consisting of silica and silicates, preferably silicates, more preferably alkali metal silicates. Among the preferred alkali metal silicates, the at least one source preferably comprises water glass, more preferably sodium and/or potassium silicate, and more preferably sodium silicate. In particularly preferred embodiments of the present invention, the source for $SiO_2$ is sodium silicate. Furthermore, in embodiments comprising silica, fumed silica is preferred.

In particular, it has surprisingly been found that when the at least one source for $SiO_2$ comprises water glass, crystallization is accelerated. This especially applies when water glass is the only source for $SiO_2$ used in the inventive process.

Further preferred are embodiments wherein the zeolitic material having a BEA framework structure further comprises $X_2O_3$, wherein X stands for any conceivable trivalent element, X standing for either one or several trivalent elements. Preferred tetravalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

If, for example, boron is incorporated, for example free boric acid and/or borates and/or boric esters, such as, for example, triethyl borate or trimethyl borate, can be used as starting materials.

According to preferred embodiments of the present invention, wherein the zeolitic material having a BEA framework structure comprises $X_2O_3$, at least one source for $X_2O_3$ is provided in step (1). In general, $X_2O_3$ can be provided in any conceivable form, provided that a zeolitic material having a BEA framework structure comprising $X_2O_3$ can be crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In more preferred embodiments of the present invention, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

According to particularly preferred embodiments of the inventive process, the mixture according to step (1) comprises at least one silicate as a source for $YO_2$ and at least one aluminate as a source for $X_2O_3$, more preferably at least one alkali metal silicate and/or at least one alkali metal aluminate, and even more preferably at least one water glass, wherein the alkali metal of said preferred embodiments preferably comprises sodium and/or potassium, more preferably sodium, and wherein the alkali metal even more preferably is sodium.

In preferred embodiments of the inventive process wherein the mixture according to step (1) comprises at least one source for $X_2O_3$, the $YO_2:X_2O_3$ molar ratio of the mixture can have any conceivable value, provided that a zeolitic material having a BEA framework structure comprising both $YO_2$ and $X_2O_3$ is crystallized in step (2). Generally, the molar ratio ranges from 1 to 100, preferably from 5 to 85, more preferably from 10 to 60, more preferably from 20 to 55, more preferably from 25 to 50, and particularly preferably from 35 to 45. Further preferred are embodiments wherein the $YO_2:X_2O_3$ molar ratio of the mixture ranges from 15 to 40, more preferably from 20 to 35, and even more preferably from 25 to 30.

In embodiments of the present invention which are further preferred, the zeolitic material obtained and/or obtainable and/or the inventive material as such according to the inventive process comprises at least on alkali metal M, preferably sodium and/or potassium, and more preferably sodium. The alkali metal can be added at any conceivable stage of the inventive process, wherein preferably it is also added in step (1). More preferably, the entire quantity of the alkali metal comprised in the zeolitic material having a BEA framework structure is added in step (1) of the inventive process. In particularly preferred embodiments of the inventive process, the alkali metal is partly or entirely contained in the at least one source for $YO_2$ and/or $X_2O_3$ provided in step (1), wherein preferably, the alkali metal is entirely contained therein.

In general, the alkali metal M can be contained in the mixture according to step (1) of the inventive process in any conceivable amount, provided that a zeolitic material having a BEA framework structure is crystallized in step (2). Preferably, the $M:YO_2$ molar ratio in the mixture according to step (1) ranges from 0.1 to 2, more preferably from 0.2 to 1, more preferably from 0.3 to 0.9, and even more preferably from 0.45 to 0.75.

According to preferred embodiments of the inventive process, the mixture according to step (1) comprises at least one source for $X_2O_3$ and at least one alkali metal M. In general, any conceivable amounts of these components can be contained in the mixture provided that a zeolitic material having a BEA framework structure is crystallized in step (2). Preferably, the $YO_2:X_2O_3:M$ molar ratios in the mixture according to step (1) range from (1-100):1:(2-90), more preferably from (5-85):1:(5-70), more preferably from (10-60):1:(8-50), more preferably from (20-55):1:(11-40), more preferably from (25-50):1:(13-35), and even more preferably from (35-45):1:(15-30).

According to the process of the present invention, the mixture provided in step (1) can contain one or more sources for hydroxide anions $OH^-$. In general any conceivable source for $OH^-$ can be used, wherein the at least one source preferably comprises a metal hydroxide, more preferably a hydroxide of an alkali metal M, more preferably sodium and/or potassium hydroxide, and even more preferably sodium hydroxide. In preferred embodiments of the inventive process, wherein the mixture comprises a silicate as a source for $YO_2$ and/or an aluminate as a source for $X_2O_3$, it is particularly preferred that the mixture does not contain a source for $OH^-$.

In general the $OH^-:YO_2$ molar ratio of the mixture according to step (1) of the inventive process can have any conceivable value, provided that a zeolitic material having a BEA framework structure is crystallized in step (2). Preferably, said molar ratio ranges from 0.1 to 1, more preferably from 0.2 to 0.9, more preferably from 0.3 to 0.7, more preferably from 0.4 to 0.65, and even more preferably from 0.43 to 0.62.

According to the process of the present invention, seed crystals are provided in step (1), wherein said seed crystals comprise a zeolitic material having a BEA framework structure. In general, said seed crystals can comprise any zeolitic material having a BEA framework structure, provided that a zeolitic material having a BEA framework structure is crystallized in step (2). Preferably, the zeolitic material having a BEA framework structure comprised in the seed crystals is a zeolitic material obtained according to the inventive process. More preferably, the zeolitic material having a BEA framework structure comprised in the seed crystals is the same as the zeolitic material having a BEA framework structure which is then crystallized in step (2). Particularly preferred are seed crystals comprising zeolite Beta, more preferably zeolite Beta which has been obtained according to the inventive process. In particularly preferred embodiments, the seed crystals are zeolite Beta crystals, preferably zeolite Beta crystals obtained according to the inventive process.

According to the inventive process, any suitable amount of seed crystals can be provided in the mixture according to step (1), provided that a zeolitic material having a BEA framework structure is crystallized in step (2). In general, the amount of seed crystals contained in the mixture according to step (1)

ranges from 0.1 to 50 wt.-% based on 100 wt.-% of $YO_2$ in the at least one source for $YO_2$, preferably from 0.5 to 40 wt.-%, more preferably from 1 to 35 wt.-%, more preferably from 2 to 25 wt.-%, more preferably from 3 to 20 wt.-%, and particularly preferably from 5 to 15 wt.-%. Further preferred according to the inventive process is an amount of seed crystals ranging from 15 to 45 wt.-%, more preferably from 20 to 40 wt. %, and even more preferably from 25 to 35 wt.-%.

In step (1) according to the present invention, the mixture can be prepared by any conceivable means, wherein mixing by agitation is preferred, preferably by means of stirring.

In preferred embodiments of the present invention, the mixture according to step (1) of the inventive process further comprises a solvent. Any conceivable solvent can be used in any conceivable amount, provided that a zeolitic material having a BEA framework structure can be crystallized in step (2). Preferably, the solvent comprises water, wherein the $H_2O:YO_2$ molar ratio of the mixture ranges from 1 to 100, preferably from 2 to 60, more preferably from 5 to 50, more preferably from 7 to 45, more preferably from 10 to 30, and particularly preferably from 15 to 25. According to the inventive process, it is further preferred that the $H_2O:YO_2$ molar ratio of the mixture ranges from 15 to 45, more preferably from 20 to 40, and even more preferably from 25 to 35. In particularly preferred embodiments, the solvent provided in step (1) is distilled water.

In preferred embodiments of the process of the present invention, the mixture according to step (1) further comprises at least one source of at least one element suitable for isomorphous substitution of at least a portion of the Y atoms and/or of the X atoms in the BEA framework structure. In general, any conceivable element can be used. In preferred embodiments, the at least one element is selected from the group consisting of Cu, Co, Cr, Ni, Fe, V, and Nb, preferably from the group consisting of Cu, Co, Cr, Ni, Fe, more preferably from the group consisting of Cu and Fe, wherein even more preferably the at least one element is Fe. In a particularly preferred embodiment, the at least one element suitable for isomorphous substitution is Fe.

In particularly preferred embodiments of the present invention, the mixture according to step (1) comprises at least one silicate and/or at least one aluminate in addition to the at least one element suitable for isomorphous substitution, wherein preferably the at least one element is Fe, and more preferably said at least one element is Fe.

Therefore, the present invention also provides a one-pot synthetic procedure for the preparation of an organotemplate-free zeolitic material having a BEA framework structure, preferably an organotemplate-free zeolitic material which is isomorphously substituted by Fe, wherein isomorphous substitution is not achieved by conventional processes involving the post-synthetic treatment of an existing framework, wherein framework elements are treated such that they may be replaced with other atoms which are then contained in the resulting framework structure. In particular, according to the inventive process it is not necessary to remove existing framework atoms for producing an isomorphously substituted framework structure.

Consequently, the present invention also relates to a one-pot synthetic procedure for the production of an organotemplate-free zeolitic material having a BEA framework structure, wherein at least a portion of the Y atoms and/or of the X atoms in the BEA framework structure is isomorphously substituted by at least one element, wherein the at least one element is preferably selected from the group consisting of Cu, Co, Cr, Ni, Fe, V, and Nb, more preferably wherein the at least one element is Fe.

In general, according to step (1) of the inventive process, the molar ratio of $YO_2$ to the element or to the sum of elements suitable for isomorphous substitution can have any conceivable value, wherein the molar ratio preferably ranges from 5 to 300, more preferably from 10 to 200, more preferably from 30 to 150, more preferably from 40 to 100, and even more preferably from 50 to 90.

In general, the single components for providing the mixture of step (1) of the inventive process can be added in any order, provided that a zeolitic material having a BEA framework structure is crystallized from the mixture in step (2). This may, for example, involve the addition of the optional solvent and optionally the at least one source for $X_2O_3$ and/or the at least one source for $OH^-$, followed by the addition of the at least one source for $YO_2$, wherein the seed crystals are only added to the mixture afterwards. Alternatively, the addition of the optional solvent and optionally the at least one source for $X_2O_3$ and/or the at least one source for $OH^-$ may be first followed by the addition of the seed crystals, wherein the at least one source for $YO_2$ is only added thereafter. The at least one source of at least one element suitable for isomorphous substitution optionally present in the mixture provided in step (1) may also be added at any point, provided that a zeolitic material having an isomorphously substituted BEA framework structure with respect to Y and/or optionally with respect to X is crystallized from the mixture in step (2). By way of example, the at least one source for isomorphous substitution may be added after the addition of the optional solvent and optionally the at least one source for $X_2O_3$ and/or the at least one source for $OH^-$, and before the addition of the at least one source for $YO_2$ and/or before the addition of the seed crystals. Alternatively, the at least one source for isomorphous substitution may be added before or after the aforementioned components of the mixture according to step (1).

In general, step (2) according to the inventive process can be conducted in any conceivable manner, provided that a zeolitic material having a BEA framework structure is crystallized from the mixture according to step (1). The mixture can be crystallized in any type of vessel, wherein a means of agitation is preferably employed, preferably by rotation of the vessel and/or stirring, and more preferably by stirring the mixture.

According to the inventive process, the mixture is preferably heated during at least a portion of the crystallization process in step (2). In general, the mixture can be heated to any conceivable temperature of crystallization, provided that a zeolitic material having a BEA framework structure is crystallized from the mixture. Preferably, the mixture is heated to a temperature of crystallization ranging from 80 to 200° C., more preferably from 90 to 180° C., more preferably from 95 to 170° C., more preferably from 100 to 160° C., more preferably from 110 to 150° C., and even more preferably from 115 to 145° C. Also preferred according to the inventive process are temperatures of crystallization ranging from 120 to 160° C., more preferably from 130 to 150° C., and even more preferably from 135 to 145° C.

The preferred heating in step (2) of the inventive process can be conducted in any conceivable manner suitable for the crystallization of a zeolitic material having a BEA framework structure. In general, heating my be conducted at one temperature of crystallization or vary between different temperatures. Preferably, a heat ramp is used for reaching the temperature of crystallization, wherein the heating rate preferably ranges from 10 to 100° C./h, more preferably from 20 to 70° C./h, more preferably from 25 to 60° C./h, more preferably from 30 to 50° C./h, and even more preferably from 35 to 45° C./h.

In preferred embodiments of the present invention, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used for example by conducting heating in an autoclave or other crystallization vessel suited for generating solvothermal conditions. In particularly preferred embodiments wherein the solvent comprises or consists of water, preferably of distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used, wherein a Teflon-lined apparatus is preferred.

In general, the duration of the crystallization process in step (2) of the inventive process is not particularly limited. In preferred embodiments involving heating of the mixture according to step (1), said crystallization process is conducted for a period ranging from 2 to 100 h, more preferably from 8 to 70 h, and even more preferably from 13 to 60 hours. According to the inventive process, it is further preferred that crystallization is conducted for a period ranging from 10 to 30 h, more preferably from 12 to 25 h, and even more preferably from 14 to 20 h. Furthermore, it is preferred that crystallization is conducted for a period ranging from 35 to 65 h, more preferably from 40 to 60 h, and even more preferably from 45 to 55 h. According to a particularly preferred embodiment of the present invention, crystallization is conducted for a period ranging from 10 to 16.5 h, more preferably from 12 to 16 h, and even more preferably from 14 to 15.5 h.

According to preferred embodiments of the present invention, wherein the mixture is heated in step (2), said heating may be conducted during the entire crystallization process or during only one or more portions thereof, provided that a zeolitic material having the BEA framework structure is crystallized. Preferably, heating is conducted during the entire duration of crystallization.

Thus, according to a particularly preferred embodiment of the inventive process, Y stands for Si and the mixture according to step (1) further comprises at least one source for $X_2O_3$ wherein X is Al, and wherein the $SiO_2:Al_2O_3$ molar ratio of the mixture according to step (1) ranges from 20 to 55, preferably from 25 to 50, and more preferably from 35 to 45. Furthermore, according to said particularly preferred embodiment, the mixture further comprises at least one source for hydroxide anions, preferably a metal hydroxide, more preferably a hydroxide of an alkali metal M, and even more preferably sodium hydroxide, wherein the $OH^-:SiO_2$ molar ratio of the mixture preferably ranges from 0.3 to 0.7, more preferably from 0.4 to 0.65, and even more preferably from 0.43 to 0.62. In addition to this, the mixture according to said particularly preferred embodiment comprises a solvent which is preferably distilled water, and the mixture of step (1) is crystallized under hydrothermal conditions in step (2) at a temperature ranging from 120 to 160° C., more preferably from 130 to 150° C., and even more preferably from 135 to 145° C., and said heating is conducted for a duration ranging from 10 to 30 h, more preferably from 12 to 25 h, and even more preferably from 14 to 20 h.

Further preferred according to said embodiment is an $H_2O:SiO_2$ molar in the mixture according to step (1) of 10 to 30, more preferably from 15 to 25, and/or an amount of seed crystals ranging from 3 to 20 wt.-%, more preferably from 5 to 15 wt.-%.

According to a further embodiment of the inventive process which is particularly preferred, Y stands for Si and the mixture according to step (1) further comprises at least one source for $X_2O_3$ wherein X is Al, and wherein the $SiO_2:Al_2O_3$ molar ratio of the mixture according to step (1) ranges from 20 to 55, preferably from 25 to 50, and more preferably from 35 to 45. Furthermore, according to said particularly preferred embodiment, the mixture further comprises at least one source for hydroxide anions, preferably a metal hydroxide, more preferably a hydroxide of an alkali metal M, and even more preferably sodium hydroxide, wherein the $OH^-:SiO_2$ molar ratio of the mixture preferably ranges from 0.3 to 0.7, more preferably from 0.4 to 0.65, and even more preferably from 0.43 to 0.62. In addition to this, the mixture according to said particularly preferred embodiment comprises at least one element suitable for isomorphous substitution of a least a portion of the Si and/or Al atoms in the BEA framework structure, wherein at least one element is preferably selected from the group consisting of Cu, Co, Cr, Ni, Fe, V, and Nb, more preferably from the group consisting of Cu and Fe, wherein even more preferably at least one element is Fe. Furthermore, the mixture according to step (1) of said particularly preferred embodiment further comprises a solvent which is preferably distilled water, and the mixture of step (1) is crystallized under hydrothermal conditions in step (2) at a temperature ranging from 120 to 160° C., more preferably from 130 to 150° C., and even more preferably from 135 to 145° C., and said heating is conducted for a duration ranging from 35 to 65 h, more preferably from 40 to 60 h, and even more preferably from 45 to 55 h. Further preferred according to said embodiment is an $H_2O:SiO_2$ molar in the mixture of step (1) of from 15 to 45, more preferably from 20 to 40, and even more preferably from 25 to 35, and/or an amount of seed crystals ranging from 3 to 20 wt.-%, and more preferably from 5 to 15 wt.-%.

According to yet a further embodiment of the inventive process which is particularly preferred, Y stands for Si and the at least one source for $SiO_2$ is an alkali metal silicate, preferably water glass, more preferably sodium silicate, wherein the mixture according to step (1) further comprises at least one source for $X_2O_3$ wherein X is Al, and wherein the $SiO_2:Al_2O_3$ molar ratio of the mixture according to step (1) ranges from 15 to 40, more preferably from 20 to 35, and even more preferably from 25 to 30. Furthermore, according to said particularly preferred embodiment, the mixture further comprises a solvent which is preferably distilled water, and the mixture of step (1) is crystallized under hydrothermal conditions in step (2) at a temperature ranging from 120 to 160° C., more preferably from 130 to 150° C., and even more preferably from 135 to 145° C., and said heating is conducted for a duration ranging from 10 to 16.5 h, more preferably from 12 to 16 h, and even more preferably from 14 to 15.5 h. Further preferred according to said embodiment is an $H_2O:SiO_2$ molar of 10 to 30, more preferably from 15 to 25, and/or an amount of seed crystals ranging from 20 to 40 wt.-%, and even more preferably from 25 to 35 wt.-%. In said particularly preferred embodiment, the mixture according to step (1) is preferably agitated during the crystallization in step (2), preferably by rotation of the vessel and/or stirring, and more preferably by stirring the mixture.

In general, the process of the present invention can optionally comprise further steps for the work-up and/or further physical and/or chemical transformation of the zeolitic material having a BEA framework structure crystallized in step (2) from the mixture provided in step (1). The crystallized material can for example be subject to any sequence of isolation and/or washing procedures, wherein the zeolitic material obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, the inventive process can optionally comprise one or more drying steps. In general, any conceivable means of drying can be used. Drying procedures preferably include heating and/or applying vacuum to the zeolitic material having a BEA framework structure. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

According to the inventive process, the zeolitic material crystallized in step (2) can optionally be subject to at least one step of an ion-exchange procedure, wherein the term "ion-exchange" according to the present invention generally refers to non-framework ionic elements and/or molecules contained in the zeolitic material. In general, any conceivable ion-exchange procedure with all possible ionic elements and/or molecules can be conducted on the zeolitic material, with the exception of organic structure directing agents specifically used in the synthesis of zeolitic materials having a BEA framework structure, in particular specific tetraalkylammonium salts and/or related organotemplates such as tetraethylammonium and/or dibenzylmethylammonium salts and/or dibenzyl-1,4-diazabicyclo[2,2,2]octane. Preferably, as ionic elements at least one cation and/or cationic element is employed which is preferably selected from the group consisting of $H^+$, $NH_4^+$, Ru, Rh, Pd, Ag, Os, Ir, Pt, Au, more preferably from the group consisting of Pd, Ag, and Pt, and even more preferably from the group consisting of Pt and Pd. Preferably, the zeolitic material is first ion-exchanged with $H^+$ and/or $NH_4^+$, and more preferably with $NH_4^+$, before being subject to a further ion-exchange procedure, more preferably before being subject to ion-exchange with one or more noble metals (Ru, Rh, Pd, Ag, Os, Ir, Pt, Au), more preferably with one or more noble metals selected from the group consisting of Pd, Ag, and Pt, and even more preferably with at least one element selected from Pt and Pd. According to the inventive process it is also preferred that instead of or in addition to said preferred ionic elements, the zeolitic material is ion-exchanged with one or more cationic elements selected from the group of elements consisting of Cu, Co, Cr, Ni, Fe, V, and Nb.

In general, the optional washing and/or isolation and/or ion-exchange procedures comprised in the inventive process can be conducted in any conceivably order and repeated as often as desired.

Therefore, the process according to the present invention optionally comprises at least one of the following steps of (3) isolating the zeolitic material having a BEA framework structure, preferably by filtration, and/or (4) washing the zeolitic material having a BEA framework structure, and/or (5) drying the zeolitic material having a BEA framework structure, and/or (6) subjecting the zeolitic material having a BEA framework structure to an ion-exchange procedure, wherein the steps (3) and/or (4) and/or (5) and/or (6) can be conducted in any order, and wherein at least one of said steps is preferably repeated at least once.

Preferably, the inventive process comprises at least one step of isolating the zeolitic material crystallized according to step (2), more preferably by filtration thereof. According to the inventive process it is further preferred that after the at least one step of isolating, the zeolitic material is subject to at least one step of drying, wherein more preferably the zeolitic material is subject to at least one step of washing prior to the at least one drying step. In a particularly preferred embodiment, the zeolitic material crystallized according to step (2) is subject to at least one step of isolating, followed by at least one step of washing, followed by at least one step of drying.

According to a further embodiment of the inventive process, the zeolitic material crystallized in step (2) is directly subject to at least one step of drying, preferably to spray drying and or spray granulation, without isolating, washing, or drying of the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein not only removal of organotemplate compounds is avoided, but also the number of post-synthesis workup steps is minimized, as a result of which the organotemplate-free zeolitic material having a BEA framework structure can be obtained from a highly simplified process.

According to a further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step.

The process according to the present invention preferably does not comprise a calcination step generally involving the heating of the zeolitic material crystallized according to step (2) above a temperature of 500° C. More preferably, a process according to the present invention for the production of a zeolitic material having a BEA framework structure which does not comprise a calcination step refers to processes, wherein the zeolitic material crystallized according to step (2) is not subject to a temperature exceeding 450° C., more preferably 350° C., more preferably 300° C., more preferably 250° C., more preferably 200° C., and even more preferably 150° C. According to the present invention it is particularly preferred that after completion of step (2) of the inventive process, wherein the crystallized zeolitic material is at ambient temperature, said material is subsequently not subject to any heating process normally or suitably conducted for removal of organotemplates form a zeolitic material having a BEA framework structure.

The present invention furthermore relates to an organotemplate-free zeolitic material having a BEA framework structure which is either obtained by the process according to the present invention or by any conceivable process which leads to a zeolitic material having a BEA framework structure as obtainable according to the inventive process.

Therefore, the present invention also relates to an organotemplate-free zeolitic material having a BEA framework structure obtainable and/or obtained according to the inventive process.

The present invention invention, however, also relates to an organotemplate-free zeolitic material having a BEA framework structure having an X-ray diffraction pattern comprising at least the following reflections:

| Intensity (%) | Diffraction angle 2θ/° [Cu K(alpha 1)] |
| --- | --- |
| [12-32] | [21.07-21.27] |
| 100 | [22.12-22.32] |
| [14-34] | [25.01-25.21] |
| [12-32] | [26.78-26.98] |
| [14-34] | [28.39-28.59] |
| [28-48] | [29.24-29.44] |
| [10-30] | [30.00-30.20] |
| [11-31] | [32.86-33.26] |
| [13-33] | [42.90-43.30] | wherein 100% relates to the intensity of the maximum peak in the X-ray powder diffraction pattern, wherein the BEA framework structure comprises $YO_2$, and wherein Y is a tetravalent element. Preferably, the organotemplate-free zeolitic material having a BEA framework structure has an X-ray diffraction pattern comprising at least the following reflections:

| Intensity (%) | Diffraction angle 2θ/° [Cu K(alpha 1)] |
| --- | --- |
| [12-32] | [21.12-21.22] |
| 100 | [22.17-22.27] |
| [14-34] | [25.06-25.16] |
| [12-32] | [26.83-26.93] |
| [14-34] | [28.44-28.54] |
| [28-48] | [29.29-29.39] |
| [10-30] | [30.05-30.15] |
| [11-31] | [33.01-33.11] |
| [13-33] | [43.05-43.15] | wherein 100% relates to the intensity of the maximum peak in the X-ray powder diffraction pattern.

According to a preferred embodiment, the organotemplate-free zeolitic material of the present invention has an X-ray diffraction pattern comprising at least the following reflections:

| Intensity (%) | Diffraction angle 2θ/° [Cu K(alpha 1)] |
| --- | --- |
| [12-32] | [21.07-21.27] |
| 100 | [22.12-22.32] |
| [14-34] | [25.01-25.21] |
| [11-31] | [25.53-25.73] |
| [12-32] | [26.78-26.98] |
| [14-34] | [28.39-28.59] |
| [28-48] | [29.24-29.44] |
| [10-30] | [30.00-30.20] |
| [11-31] | [32.86-33.26] |
| [13-33] | [42.90-43.30] | wherein more preferably the X-ray diffraction pattern comprises at least the following reflections:

| Intensity (%) | Diffraction angle 2θ/° [Cu K(alpha 1)] |
| --- | --- |
| [12-32] | [21.12-21.22] |
| 100 | [22.17-22.27] |
| [14-34] | [25.06-25.16] |
| [11-31] | [25.58-25.68] |
| [12-32] | [26.83-26.93] |
| [14-34] | [28.44-28.54] |
| [28-48] | [29.29-29.39] |
| [10-30] | [30.05-30.15] |
| [11-31] | [33.01-33.11] |
| [13-33] | [43.05-43.15] | wherein 100% relates to the intensity of the maximum peak in the X-ray powder diffraction pattern.

Preferably, the organotemplate-free zeolitic material having a BEA framework structure displaying a powder diffraction pattern according to the present invention is an organotemplate-free zeolitic material which is either obtained by the process according to the present invention or by any conceivable process which leads to a zeolitic material having a BEA framework structure as obtainable according to the inventive process.

According to the present invention, the zeolitic material does not contain more than an impurity of an organic structure directing agent specifically used in the synthesis of zeolitic materials having a BEA framework structure, in particular specific tetraalkylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the inventive process.

According to the present invention, in the zeolitic material having a BEA framework structure, Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

In preferred embodiments of the present invention, the framework of the zeolitic material having a BEA structure further comprises $X_2O_3$, wherein X stands for any conceivable trivalent element, X standing for either one or several trivalent elements. Preferred trivalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

Preferably, the zeolitic material of the present invention comprises at least on alkali metal M, more preferably sodium and/or potassium, and even more preferably sodium, wherein said at least one alkali metal is a non-framework element of the zeolitic material.

According to the present invention, the organotemplate-free zeolitic material having a BEA framework is preferably non-calcinated, more preferably within the meaning of the present invention. Even more preferably, with the exception of the conditions in which it is crystallized, the zeolitic material having a BEA framework structure according to the present invention has not been subject to a heating process normally or suitably conducted for removal of organotemplates form a zeolitic material having a BEA framework structure.

In preferred embodiments of the present invention, the $YO_2:X_2O_3$ molar ratio of the organotemplate-free zeolitic material ranges from 2 to 100, more preferably from 4 to 70, more preferably from 5 to 50, more preferably from 6 to 30, more preferably from 7 to 20, more preferably from 8 to 15, and even more preferably from 9 to 13.

It is further preferred according to the present invention that the $YO_2:X_2O_3$ molar ratio of the organotemplate-free zeolitic material ranges from 3 to 20, more preferably from 4 to 18, more preferably from 6 to 16, more preferably from 8 to 14, more preferably from 9 to 13, and even more preferably from 10.5 to 12.5.

According to preferred embodiments of the present invention, wherein the organotemplate-free zeolitic material comprises one or more alkali metals M as non-framework elements, the molar ratio $M:X_2O_3$ preferably ranges from 0.005 to 10, more preferably from 0.05 to 7, more preferably from 0.5 to 6, more preferably from 1 to 5, more preferably from 1.5 to 4.5, and even more preferably from 2 to 4.

According to the present invention it is further preferred that when the organotemplate-free zeolitic material comprises one or more alkali metals M as non-framework elements, the molar ratio $M:X_2O_3$ preferably ranges from 0.001 to 2, more preferably from 0.01 to 1, more preferably from 0.05 to 0.5, more preferably from 0.07 to 0.3, and even more preferably from 0.1 to 0.2.

In general, at least a portion of the alkali metals optionally present as non-framework elements in the zeolitic material having a BEA framework structure can be substituted by at least one cation and/or cationic element suited for ion-exchange in the zeolitic material, with the exception of organic structure directing agents specifically used in the synthesis of zeolitic materials having a BEA framework structure, in particular specific tetraalkylammonium salts and/or related organotemplates such as tetraethylammonium and/or dibenzylm-ethylammonium salts and/or dibenzyl-1,4-diazabicyclo[2,2,2]octane. Preferably, at least one cation and/or cationic element is selected from the group consisting of $H^+$, $NH_4^+$, Ru, Rh, Pd, Ag, Os, Ir, Pt, Au, more preferably from the group consisting of Pd, Ag, and Pt, and even more preferably from the group consisting of Pt and Pd. According to the present invention it is also preferred that instead of or in addition to said preferred ionic elements, one or more cationic element is selected from the group of elements consisting of Cu, Co, Cr, Ni, Fe, V, and Nb.

According to preferred embodiments of the present invention, at least a portion of the Y atoms in the BEA framework is isomorphously substituted by at least one element. In general, Y can be isomorphously substituted by any suitable element, wherein the at least one element is preferably selected from the group consisting of Cu, Co, Cr, Ni, Fe, V, and Nb, more preferably from the group consisting of Cu, Co, Cr, Ni, Fe, more preferably from the group consisting of Cu and Fe, wherein even more preferably the at least one element is Fe. In a particularly preferred embodiment, at least a portion of the Y atoms in the BEA framework is isomorphously substituted by Fe.

In embodiments according to the present invention, wherein at least a portion of the Y atoms in the BEA framework is isomorphously substituted by at least one element, the molar ratio of $YO_2$ to the at least one element preferably ranges from 5 to 100, more preferably from 10 to 80, more preferably from 20 to 70, and even more preferably from 25 to 65. Further preferred are embodiments wherein the molar ratio of $YO_2$ to the at least one element ranges from 5 to 60, more preferably from 10 to 50, more preferably from 20 to 40, and even more preferably from 25 to 35. In addition to these, embodiments are preferred wherein the molar ratio of $YO_2$ to the at least one element preferably ranges from 30 to 85, more preferably from 35 to 70, more preferably from 40 to 65, and even more preferably from 45 to 60.

According to the present invention, the organotemplate-free zeolitic material having a BEA framework structure preferably has a BET surface area determined according to DIN 66135 of from 200 to 700 $m^2/g$, preferably from 400 to 650 $m^2/g$, more preferably from 475 to 575 $m^2/g$, and even more preferably from 500 to 550 $m^2/g$.

Depending on the specific needs of its application, the inventive material can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising the zeolitic material of the present invention having a BEA framework structure.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In general, the zeolitic material described above can be used as molecular sieve, adsorbent, catalyst, catalyst support or binder thereof. Especially preferred is the use as catalyst. For example, the zeolitic material can be used as molecular sieve to dry gases or liquids, for selective molecular separation, e.g. for the separation of hydrocarbons or amides; as ion exchanger; as chemical carrier; as adsorbent, in particular as adsorbent for the separation of hydrocarbons or amides; or as a catalyst. Most preferably, the zeolitic material according to the present invention is used as a catalyst.

According to a preferred embodiment of the present invention, the organotemplate-free zeolitic material of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. In particularly preferred embodiments of the present invention, the zeolitic material is used as a catalyst and/or catalyst support in a fluid catalytic cracking (FCC) process. According to a further embodiment of the present invention, the zeolitic material of the invention is preferably used in a catalytic process involving the conversion of at least one compound comprising at least one nitrogen-oxygen bond.

Particularly preferred according to the present invention is the use of the zeolitic material having a BEA framework structure as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes.

The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

Therefore, the present invention also relates to a method for selectively reducing nitrogen oxides NO by contacting a stream containing NO with a catalyst containing the zeolitic material having a BEA framework structure according to the present invention under suitable reducing conditions; to a method of oxidizing $NH_3$, in particular of oxidizing $NH_3$ slip in diesel systems, by contacting a stream containing $NH_3$ with a catalyst containing the zeolitic material having a BEA framework structure according to the present invention under suitable oxidizing conditions; to a method of decomposing of $N_2O$ by contacting a stream containing $N_2O$ with a catalyst containing the zeolitic material having a BEA framework structure according to the present invention under suitable decomposition conditions; to a method of controlling emissions in Advanced Emission Systems such as Homogeneous Charge Compression Ignition (HCCI) engines by contacting an emission stream with a catalyst containing the zeolitic material having a BEA framework structure according to the present invention under suitable conditions; to a fluid catalytic cracking FCC process wherein the zeolitic material having a BEA framework structure according to the present invention is employed as additive; to a method of converting an organic compound by contacting said compound with a catalyst containing the zeolitic material having a BEA framework structure according to the present invention under suitable conversion conditions; to a "stationary source" process wherein a catalyst is employed containing the zeolitic material having a BEA framework structure according to the present invention.

Therefore, the present invention also relates to a method for selectively reducing nitrogen oxides $NO_x$ wherein a gaseous stream containing nitrogen oxides $NO_x$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Most preferably, the zeolitic material according to the present invention or the zeolitic material obtainable of obtained according to the present invention is used as a molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for selective catalytic reduction of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

When preparing specific catalytic compositions or compositions for different purposes, it is also conceivable to blend the zeolitic material according to the present invention having a BEA framework structure with at least one other catalytically active material or a material being active with respect to the intended purpose. It is also possible to blend at least two different inventive materials which may differ in the $YO_2$:$X_2O_3$ ratio, preferably in the $SiO_2$:$Al_2O_3$ ratio, and/or in the presence or absence of a further metal such as a transition metal and/or in the specific amounts of a further metal such as a transition metal. It is also possible to blend at least two different inventive materials with at least one other catalytically active material or a material being active with respect to the intended purpose.

The catalysts of the present invention may also be provided in the form of extrudates, pellets, tablets or particles of any other suitable shape, for use as a packed bed of particulate catalyst, or as shaped pieces such as plates, saddles, tubes, or the like.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention having a BEA framework structure may be deposited on an open cell foam substrate. Such substrates are well known in the art, and are typically formed of refractory ceramic or metallic materials.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The present invention therefore relates to the use of the organotemplate-free zeolitic material of the invention, in particular in the field of catalysis and/or in the treatment of exhaust gas, wherein said exhaust gas treatment comprises industrial and automotive exhaust gas treatment. In these and other applications, the zeolitic material of the present invention can by way of example be used as a molecular sieve, catalyst, and/or catalyst support.

In embodiments of the present invention involving the use of the zeolitic material of the invention in exhaust gas treatment, the zeolitic material is preferably used in the treatment of industrial or automotive exhaust gas, more preferably as a molecular sieve in said applications. In a particularly preferred embodiment, the zeolitic material used in exhaust gas treatment is comprised in a hydrocarbon trap.

The present invention moreover relates to methods for the use of the organotemplate-free zeolitic material of the invention, in particular in the field of catalysis and/or in the treatment of exhaust gas, wherein said exhaust gas treatment comprises industrial and automotive exhaust gas treatment. In these and other methods of use, the zeolitic material of the present invention can by way of example be used as a molecular sieve, catalyst, and/or catalyst support.

According to a preferred embodiment of the present invention, the method involves the use of the organotemplate-free zeolitic material of the invention in a catalytic process, preferably as a catalyst and/or catalyst support, and more preferably as a catalyst. In general, in the methods according to the present invention the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. In particularly preferred embodiments of the present invention, in said methods of use the zeolitic material is used as a catalyst and/or catalyst support in a fluid catalytic cracking (FCC) process.

According to a further embodiment of the present invention, the method of use involves the use of the zeolitic material of the invention in a catalytic process involving the conversion of at least one compound comprising at least one nitrogen-oxygen bond. Particularly preferred are methods of use wherein the zeolitic material of the invention is used as a catalyst and/or catalyst support in a selective catalytic reduction (SCR) process.

In embodiments of the present invention involving a method of use of the zeolitic material of the invention in exhaust gas treatment, the zeolitic material is preferably used in the treatment of industrial or automotive exhaust gas, more preferably as a molecular sieve in said applications. In a particularly preferred embodiment, in the method of use for exhaust gas treatment the zeolitic material of the invention is comprised in a hydrocarbon trap.

In addition to the above-mentioned, the present invention further comprises the following embodiments:

1. An organotemplate-free synthetic process for the production of a zeolitic material having a BEA framework structure comprising $YO_2$ and optionally comprising $X_2O_3$, wherein said process comprises the steps of
   (1) preparing a mixture comprising seed crystals and at least one source for $YO_2$; and
   (2) crystallizing the mixture,
   wherein Y is a tetravalent element, and X is a trivalent element,
   wherein the zeolitic material optionally comprises at least one alkali metal M,
   wherein when the BEA framework additionally comprises $X_2O_3$, the mixture according to step (1) comprises at least one source for $X_2O_3$, and
   wherein the seed crystals comprise zeolitic material having a BEA framework structure, preferably zeolite Beta.
2. The process according to embodiment 1, wherein Y is selected from the group consisting of Si, Sn, Ti, Zr, Ge, and a mixture of two or more thereof, Y preferably being Si.
3. The process according to embodiment 1 or 2, wherein the at least one source for $YO_2$ comprises at least one silicate, preferably a silicate of an alkali metal M.
4. The process according to embodiment 3, wherein the at least one source for $YO_2$ comprises water glass, preferably sodium and/or potassium silicate, more preferably sodium silicate.
5. The process according to any one of embodiments 1 to 4, wherein X is selected from the group consisting of Al, B, In, Ga, and a mixture of two or more thereof, X preferably being Al.
6. The process according to any one of embodiments 1 to 5, wherein the at least one source for $X_2O_3$ comprises at least one aluminate salt, preferably an aluminate of an alkali metal M.
7. The process according to embodiment 6, wherein the at least one source for $X_2O_3$ comprises sodium and/or potassium aluminate, preferably sodium aluminate.
8. The process according to any one of embodiments 1 to 7, wherein the $YO_2:X_2O_3$ molar ratio of the mixture according to step (1) ranges from 20 to 55.
9. The process according to any one of embodiments 1 to 8, wherein the amount of seed crystals in the mixture according to step (1) ranges from 1 to 35 wt.-% based on 100 wt.-% of $YO_2$ in the at least one source for $YO_2$.
10. The process according to any one of embodiments 1 to 9, wherein the mixture according to step (1) further comprises a solvent, wherein said solvent preferably comprises water.
11. The process according to embodiment 10, wherein the $H_2O:YO_2$ molar ratio of the mixture according to step (1) ranges from 7 to 45.
12. The process according to any one of embodiments 1 to 11, wherein the mixture according to step (1) further comprises at least one source for $OH^-$, wherein said at least one source for $OH^-$ preferably comprises a metal hydroxide, more preferably a hydroxide of an alkali metal M, even more preferably sodium and/or potassium hydroxide.
13. The process according to embodiment 12, wherein the $OH^-:YO_2$ molar ratio of the mixture according to step (1) ranges from 0.3 to 0.7.
14. The process according to any one of embodiments 1 to 13, wherein the mixture according to step (1) further comprises at least one source of at least one element suitable for isomorphous substitution of at least a portion of the Y atoms, and/or of the X atoms in the BEA framework structure, wherein at least one element is preferably selected from the group consisting of Cu, Co, Cr, Ni, Fe, V, and Nb, and wherein more preferably at least one element is Fe.
15. The process according to embodiment 14, wherein the molar ratio of $YO_2$ to the at least one element suitable for isomorphous substitution of at least a portion of the Y atoms and/or of the X atoms in the BEA framework structure ranges from 40 to 100.
16. The process according to any one of embodiments 1 to 15, wherein the $M:YO_2$ molar ratio in the mixture according to step (1) ranges from of 0.2 to 1.
17. The process according to any one of embodiments 1 to 16, wherein the $YO_2:X_2O_3:M$ molar ratios in the mixture according to step (1) range from (20-55):1:(11-40).
18. The process according to any one of embodiments 1 to 17, wherein the crystallization in step (2) involves heating of the mixture, preferably at a temperature ranging from 100 to 160° C.
19. The process according to any one of embodiments 18, wherein the crystallization in step (2) is conducted under solvothermal conditions.

20. The process according to embodiment 18 or 19, wherein the crystallization in step (2) involves heating of the mixture for a period ranging from 10 to 16.5 h.
21. The process according to any one of embodiments 1 to 20, wherein the crystallization in step (2) involves agitating the mixture, preferably by stirring.
22. The process according to any one of embodiments 1 to 21 further comprising at least one of the following steps of
    (3) isolating the zeolitic material having a BEA framework structure, preferably by filtration, and/or
    (4) washing the zeolitic material having a BEA framework structure, and/or
    (5) drying the zeolitic material having a BEA framework structure, and/or
    (6) subjecting the zeolitic material having a BEA framework structure to an ion-exchange procedure,
    wherein the steps (3) and/or (4) and/or (5) and/or (6) can be conducted in any order, and
    wherein at least one of said steps is preferably repeated at least once.
23. The process according to embodiment 22, wherein in the at least one step (6) at least one ionic non-framework element contained in the zeolitic material having a BEA framework is ion-exchanged, preferably against at least one cation and/or cationic element, wherein at least one cation and/or cationic element is preferably selected from the group consisting of $H^+$, $NH_4^+$, Ru, Rh, Pd, Ag, Os, Ir, Pt, Au, more preferably from the group consisting of Pd, Ag, and Pt, and even more preferably from the group consisting of Pt and Pd.
24. The process according to any one of embodiments 1 to 23, wherein the zeolitic material having a BEA framework structure formed in step (2) comprises zeolite Beta.
25. The process according to any one of embodiments 1 to 24, wherein the seed crystals comprise a zeolitic material having a BEA framework structure as synthesized according to the process of any one of embodiments 1 to 24, preferably zeolite Beta.
26. The process according to any one of embodiments 1 to 25, wherein the organotem-plate-free synthesis does not comprise a calcination step.
27. An organotemplate-free zeolitic material having a BEA framework structure obtainable and/or obtained according to any one of embodiments 1 to 26, wherein said zeolitic material is preferably non-calcinated.
28. An organotemplate-free zeolitic material having a BEA framework structure, optionally obtainable and/or obtained according to any one of embodiments 1 to 27, having an X-ray diffraction pattern comprising at least the following reflections:

| Intensity (%) | Diffraction angle 2θ/° [Cu K(alpha 1)] |
|---|---|
| [12-32] | [21.07-21.27] |
| 100 | [22.12-22.32] |
| [14-34] | [25.01-25.21] |
| [12-32] | [26.78-26.98] |
| [14-34] | [28.39-28.59] |
| [28-48] | [29.24-29.44] |
| [10-30] | [30.00-30.20] |
| [11-31] | [32.86-33.26] |
| [13-33] | [42.90-43.30] | wherein 100% relates to the intensity of the maximum peak in the X-ray powder diffraction pattern, wherein the BEA framework structure comprises $YO_2$ and optionally comprises $X_2O_3$,
wherein Y is a tetravalent element, and X is a trivalent element,
wherein the zeolitic material optionally comprises at least one alkali metal M, and
wherein the zeolitic material is preferably non-calcinated.
29. The organotemplate-free zeolitic material according to embodiment 28, wherein the X-ray diffraction pattern comprises the following reflection:

| Intensity (%) | Diffraction angle 2θ/° [Cu K(alpha 1)] |
|---|---|
| [11-31] | [25.53-25.73] |

30. The organotemplate-free zeolitic material according to any one of embodiments 27 to 29, wherein the $YO_2$:$X_2O_3$ molar ratio ranges from 3 to 20.
31. The organotemplate-free zeolitic material according to any one of embodiments 27 to 30, wherein the molar ratio of alkali metal M:$X_2O_3$ ranges from 1 to 5.
32. The organotemplate-free zeolitic material according to any one of embodiments 27 to 31, wherein Y is selected from the group consisting of Si, Sn, Ti, Zr, Ge, and a mixture of two or more thereof, Y preferably being Si.
33. The organotemplate-free zeolitic material according to any one of embodiments 27 to 32, wherein X is selected from the group consisting of Al, B, In, Ga, and a mixture of two or more thereof, X preferably being Al.
34. The organotemplate-free zeolitic material according to any one of embodiments 27 to 33, wherein said material comprises at least sodium and/or potassium, preferably at least sodium.
35. The organotemplate-free zeolitic material according to any one of embodiments 27 to 34, wherein at least a portion of the Y atoms and/or of the X atoms in the BEA framework structure is isomorphously substituted by at least one element, wherein at least one element is preferably selected from the group consisting of Cu, Co, Cr, Ni, Fe, V, and Nb, and wherein more preferably at least one element is Fe.
36. The organotemplate-free zeolitic material according to embodiment 35, wherein the molar ratio of $YO_2$ to the at least one element ranges from 20 to 70.
37. The organotemplate-free zeolitic material according to any one of embodiments 27 to 36, wherein at least a portion of the alkali metal atoms M is substituted by at least one cation and/or cationic element, wherein at least one cation and/or cationic element is preferably selected from the group consisting of $H^+$, $NH_4^+$, Ru, Rh, Pd, Ag, Os, Ir, Pt, Au, more preferably from the group consisting of Pd, Ag, and Pt, and even more preferably from the group consisting of Pt and Pd.
38. The organotemplate-free zeolitic material according to any one of embodiments 27 to 37, wherein the BET surface area of the zeolitic material determined according to DIN 66135 ranges from 400 to 650 $m^2/g$, preferably from 475 to 575 $m^2/g$.
39. The organotemplate-free zeolitic material according to any one of embodiments 27 to 38, wherein said material comprises zeolite Beta.
40. Use of an organotemplate-free zeolitic material according to any one of embodiments 27 to 39 in a catalytic process, preferably as a catalyst.

41. The use according to embodiment 40 in a fluid catalytic cracking (FCC) process or in selective catalytic reduction (SCR).
42. Use of an organotemplate-free zeolitic material according to any one of embodiments 27 to 39 in exhaust gas treatment, preferably in the treatment of industrial or automotive exhaust gas.
43. The use according to embodiment 42 wherein the zeolitic material is comprised in a hydrocarbon trap.
44. A method of using an organotemplate-free zeolitic material according to any one of embodiments 27 to 39 in a catalytic process, preferably as a catalyst.
45. The method of embodiment 44, wherein the organotemplate-free zeolitic material is used as a catalyst in a fluid catalytic cracking (FCC) process or in selective catalytic reduction (SCR).
46. A method of using an organotemplate-free zeolitic material according to any one of embodiments 27 to 39 in exhaust gas treatment, preferably in the treatment of industrial or automotive exhaust gas.
47. The method of embodiment 46 wherein the zeolitic material is comprised in a hydrocarbon trap.

DESCRIPTION OF THE FIGURES

The powder X-ray diffraction patterns displayed in the figures were recorded on a Siemens D-5000 with monochromatic Cu K alpha-1 radiation, a capillary sample holder being used in order to avoid a preferred orientation. The diffraction data were collected using a position-sensitive detector from Braun, in the range from 8 to 96° (2 theta) and with a step width of 0.0678°. Indexing of the powder diagram was effected using the program Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities are plotted along the ordinate.

FIGS. 1b, 2-10, 11a, 12, 13a, 14, and 15a show the X-ray diffraction pattern of the crystalline material obtained according to Examples 1 to 10, 11A, and 12 to 15, respectively. FIG. 14 further includes both the line patterns of zeolite Beta obtained from template mediated synthesis and from mordenite for comparison.

FIG. 11c shows the $^{27}$Al MAS NMR spectrum of the crystalline material obtained according to Example 11A.

EXAMPLES

Example 1

0.117 g of $NaAlO_2$ and 0.36 g of NaOH were dissolved in 5.04 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:10.46 $Na_2O$:566.66 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 1A:
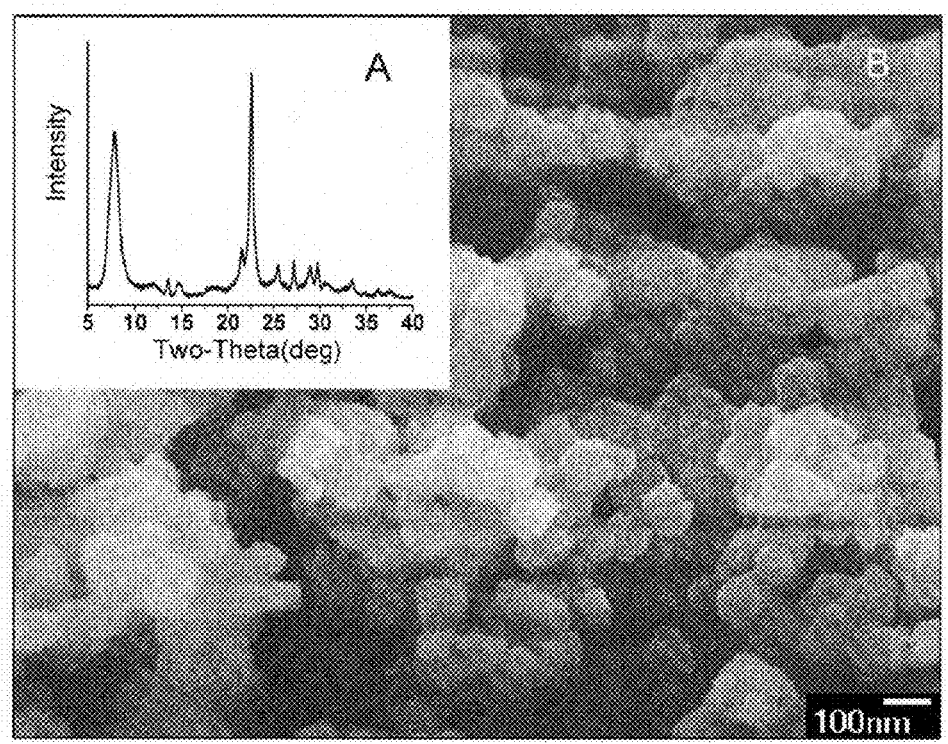
FIG. 1a shows the X-ray diffraction (XRD) pattern and scanning electron microscope (SEM) image of the Beta seeds supplied from Sinopec Catalyst Company used in the Examples.

FIG. 1a shows the XRD and SEM of the zeolite Beta seeds commercially obtained from Sinopec Catalyst Company.

Figure 1B:
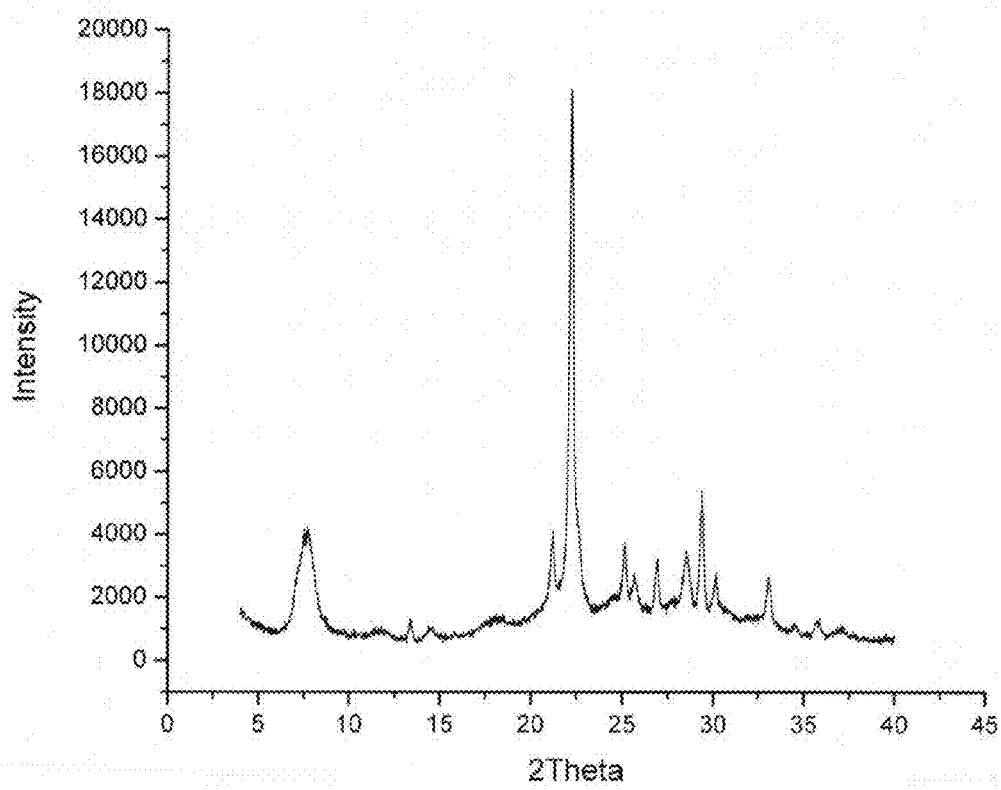

In FIG. 1b, the XRD of the crystalline product obtained from the organotemplate-free synthesis of Example 1 after filtration and drying is displayed. In particular, the XRD pattern is typical for a BEA framework structure.

Figure 1C:
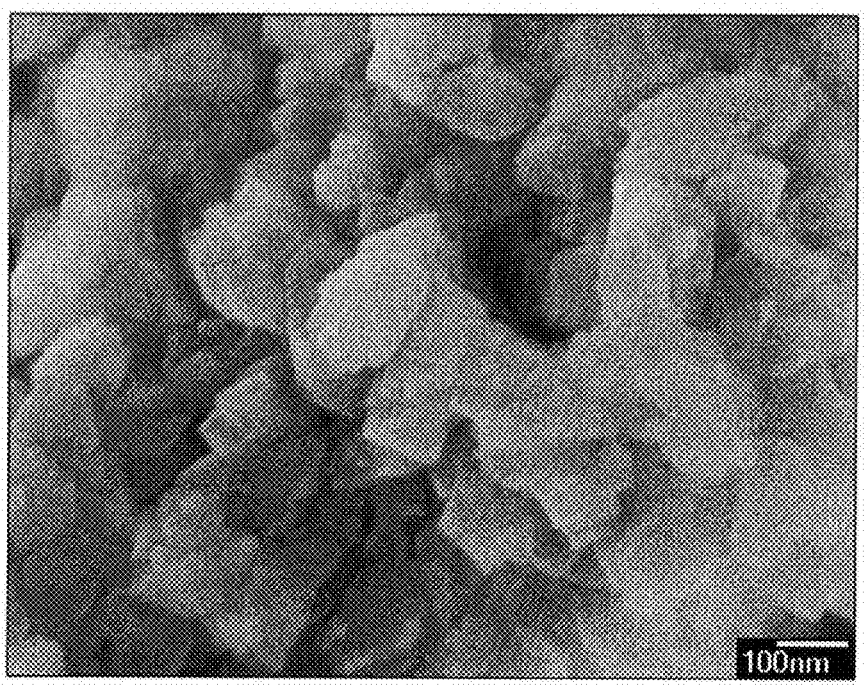
FIGS. 1c, 11d, 13b and c, and 15b and c show the scanning electron microscope (SEM) images obtained from samples of the crystalline products obtained according to Examples 1, 11A, 13, and 15, respectively.

FIG. 1c shows an SEM image of the crystalline material obtained according to Example 1.

Figure 1D:
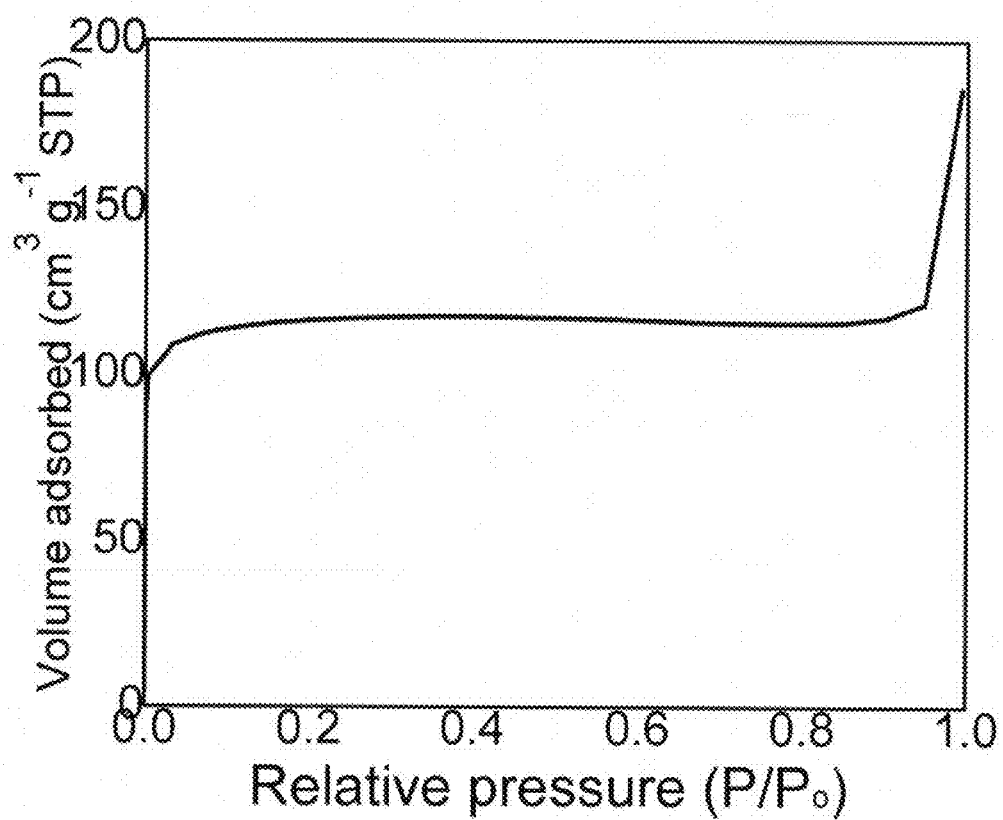
FIGS. 1d and 11e show the nitrogen adsorption isotherms according to Examples 1 and 11A, respectively. In these figures, the relative pressure $p/p^0$ is plotted along the abscissa and the pore volume in ml/g (STP (standard pressure and temperature)), determined according to DIN 66134 at 77 K, is plotted along the ordinate.

In FIG. 1d, the nitrogen isotherm obtained using the crystalline material from Example 1 is shown. In particular, the step-like curve of a type I adsorption isotherm typical of microporous solids is evident (cf. DIN 66135), indicating that the as-synthesized zeolitic material has open micropores.

Example 2

0.117 g of $NaAlO_2$ and 0.40 g of NaOH were dissolved in 5.04 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:11.46 $Na_2O$:566.66 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 2:
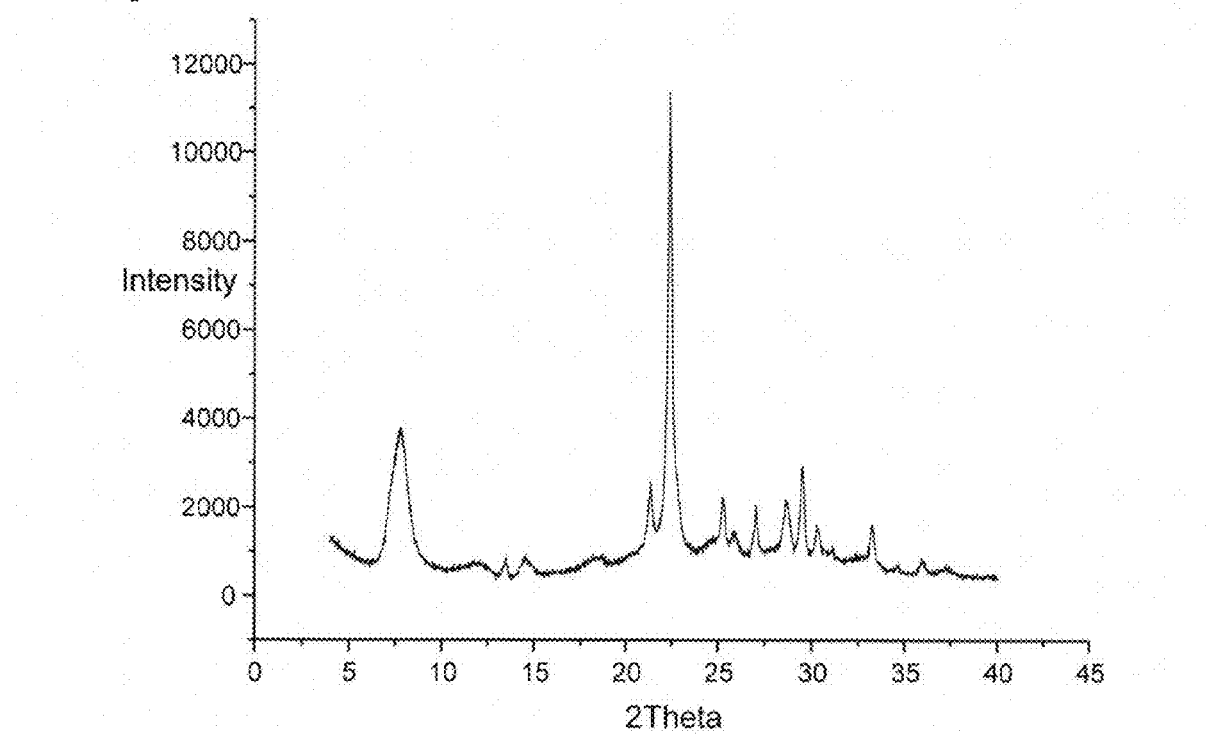

In FIG. 2, the XRD of the crystalline product obtained according to Example 2 is displayed. As can be seen from the XRD pattern, the product has a BEA framework structure.

Example 3

0.117 g of $NaAlO_2$ and 0.45 g of NaOH were dissolved in 5.04 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:12.72 $Na_2O$:566.26 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 3:
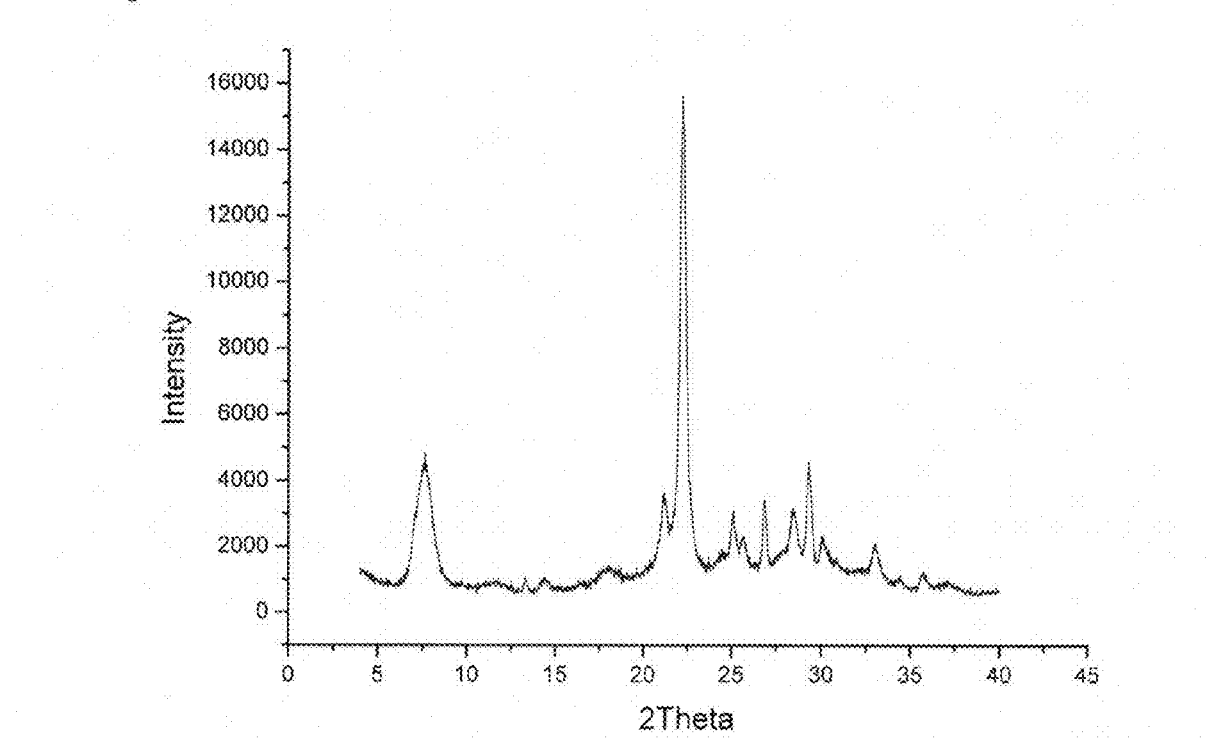

In FIG. 3, the XRD of the crystalline product obtained according to Example 3 is displayed.

Example 4

0.15 g of $NaAlO_2$ and 0.45 g of NaOH were dissolved in 5.04 ml of $H_2O$, followed by addition of 1.2 g of fumed silica. The mixture was then stirred for 15 min, thus affording an aluminosililcate gel with a molar ratios of 31.42 $SiO_2$:1.00 $Al_2O_3$:10.23 $Na_2O$:442.57 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 21 h. After having let the reaction mixture cool to room temperature, it was filtered and then dried at 80° C., thus affording a crystalline product.

Figure 4:
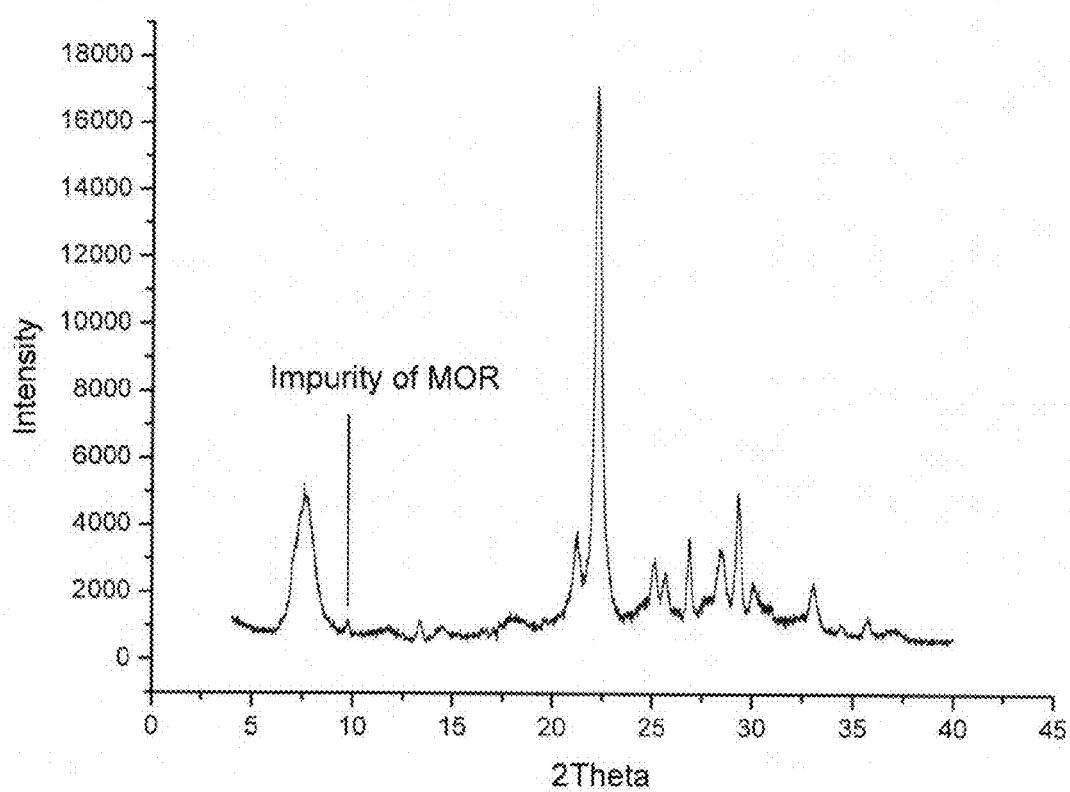

In FIG. 4, the XRD of the crystalline product obtained according to Example 4 is displayed, showing additional weak reflections stemming from mordenite side-product.

Example 5

0.117 g of $NaAlO_2$ and 0.40 g of NaOH were dissolved in 5.04 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:11.46 $Na_2O$:566.66 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 21 h. After having let the reaction mixture cool to room temperature, it was filtered and then dried at 80° C., thus affording a crystalline product.

Figure 5:
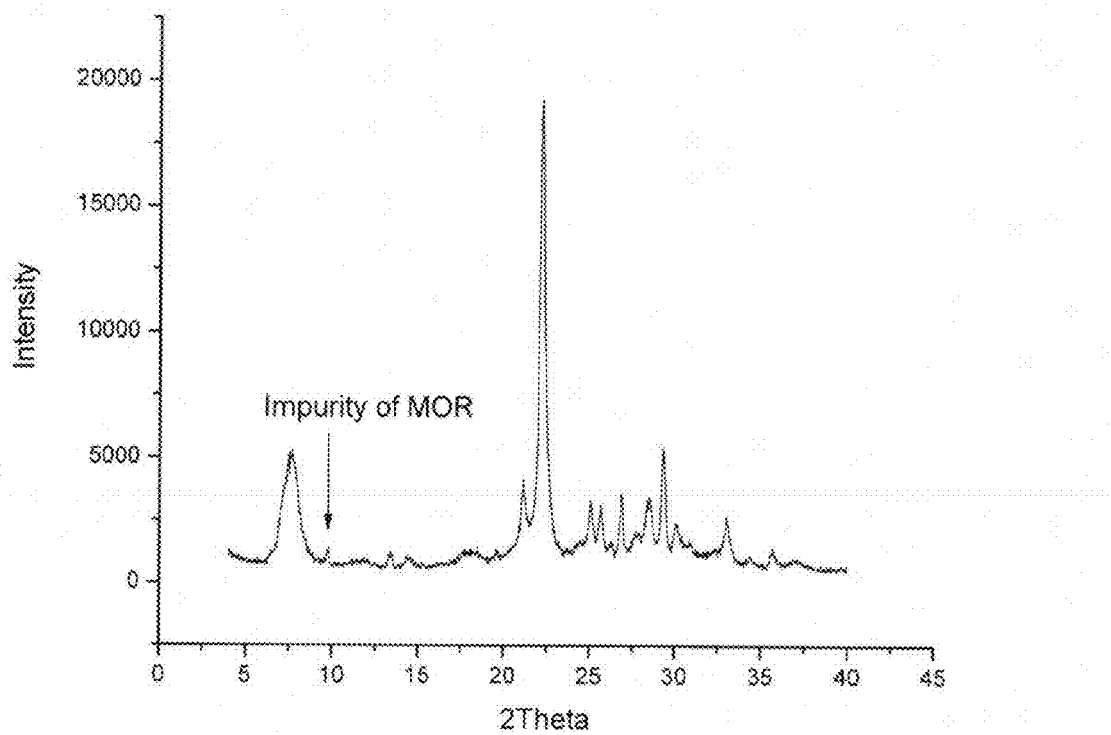

In FIG. 5, the XRD of the crystalline product obtained according to Example 5 is displayed, showing additional weak reflections stemming from mordenite side-product.

Example 6

0.15 g of $NaAlO_2$ and 0.45 g of NaOH were dissolved in 5.04 ml of $H_2O$, followed by addition of 1.2 g of fumed silica. The mixture was then stirred for 15 min, thus affording an aluminosililcate gel with a molar ratios of 31.42 $SiO_2$:1.00 $Al_2O_3$:10.23 $Na_2O$:442.57 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 24 h. After having let the reaction mixture cool to room temperature, it was filtered and then dried at 80° C., thus affording a crystalline product.

Figure 6:
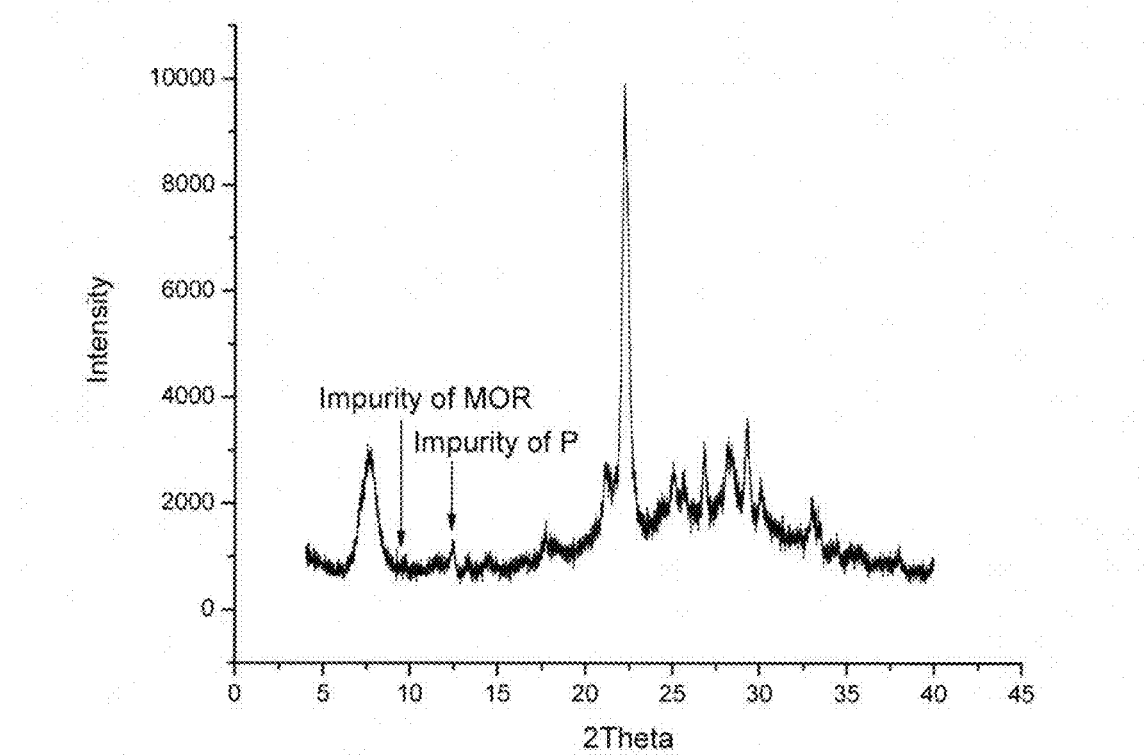

In FIG. 6, the XRD of the crystalline product obtained according to Example 6 is displayed, showing additional weak reflections stemming from mordenite and zeolite P side-products.

Example 7

0.117 g of $NaAlO_2$ and 0.40 g of NaOH were dissolved in 7.20 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:11.46 $Na_2O$:809.51 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 7:
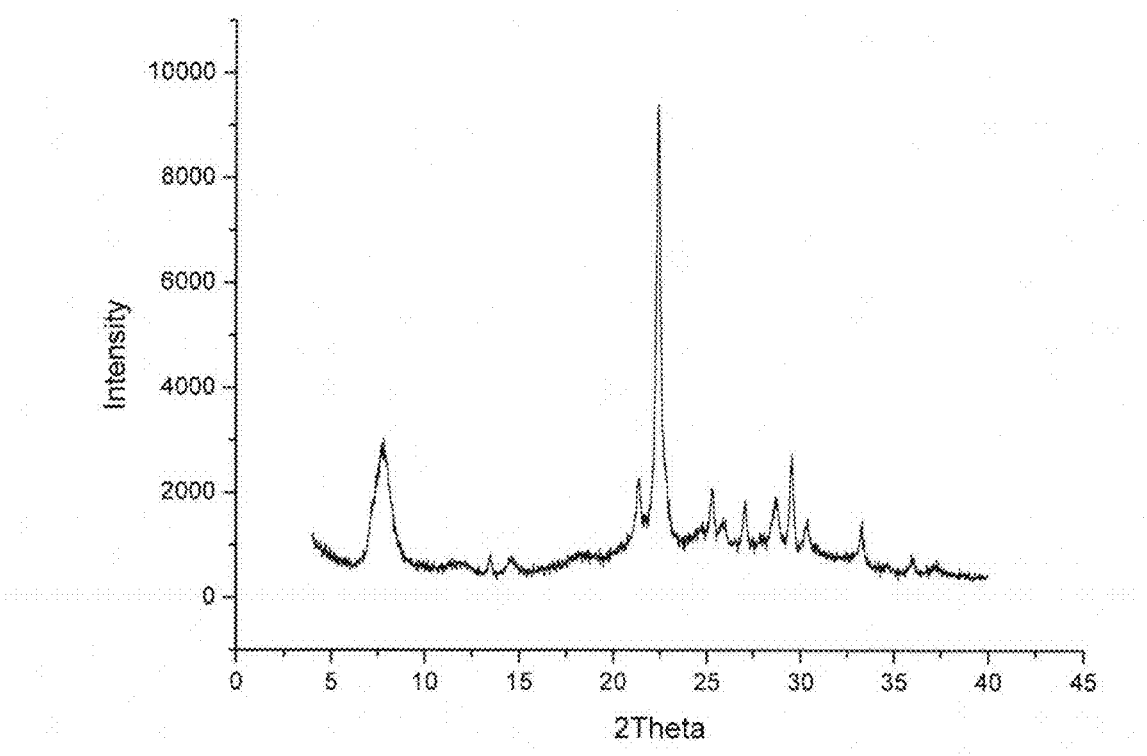

In FIG. 7, the XRD of the crystalline product obtained according to Example 7 is displayed.

Example 8

0.117 g of $NaAlO_2$ and 0.456 g of NaOH were dissolved in 10.08 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:13.06 $Na_2O$:1133.32 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 8:
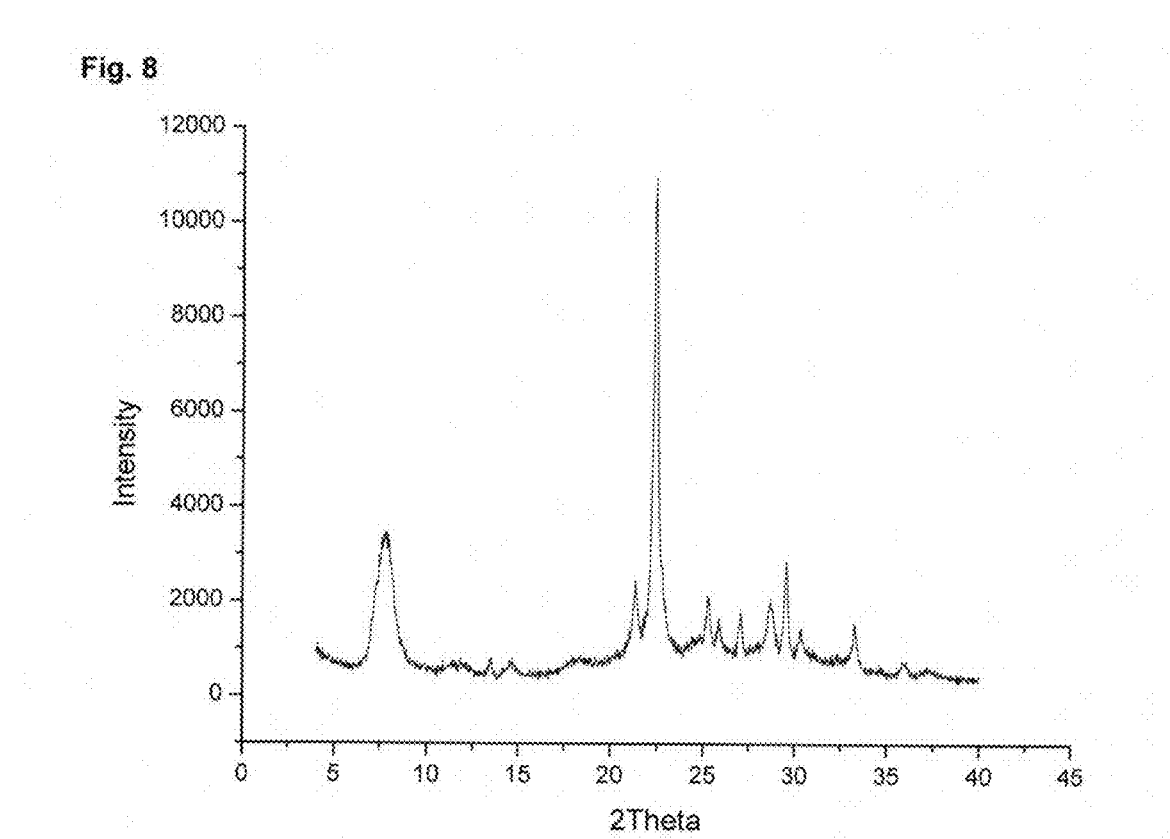

In FIG. 8, the XRD of the crystalline product obtained according to Example 8 is displayed.

Example 9

0.117 g of $NaAlO_2$ and 0.44 g of NaOH were dissolved in 11.52 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:12.61 $Na_2O$:1295.22 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

Figure 9:
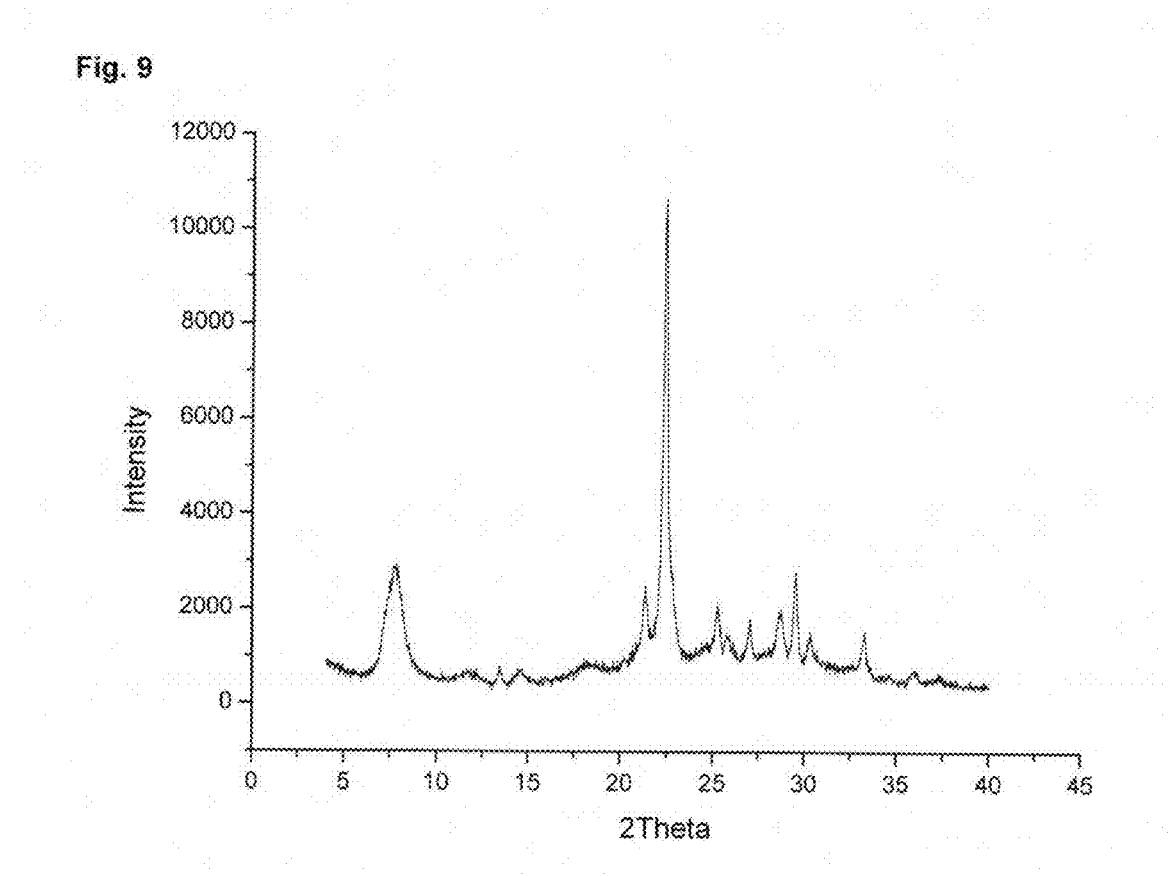

In FIG. 9, the XRD of the crystalline product obtained according to Example 9 is displayed.

Example 10

0.117 g of $NaAlO_2$ and 0.48 g of NaOH were dissolved in 14.40 ml of $H_2O$, followed by addition of 1.2 g of fumed silica. The mixture was then stirred for 15 min, thus affording an aluminosililcate gel with a molar ratios of 40.28 $SiO_2$:1.00 $Al_2O_3$:13.75 $Na_2O$:1619.03 $H_2O$. 0.12 g of zeolite Beta seeds (comercially obtained from Sinopec Catalyst Co.) were then introduced into the gel, followed by stirring for 15 min at room temperature. The gel mixture was then transferred into an autoclave and crystallized at 140° C. for 19 h. After having let the reaction mixture cool to room temperature, it was filtered and then dried at 80° C., thus affording a crystalline product.

In FIG. 10, the XRD of the crystalline product obtained according to Example 10 is displayed.

Example 11A 1.34 g of $NaAlO_2$ and 6.54 g of NaOH were dissolved in 142.23 ml of $H_2O$ while stirring, followed by addition of 1.69 g of zeolite Beta seeds (comercially obtained from Zeolyst International). 16.87 g of fumed silica (Aerosil® 200) was then added to the mixture in portions while stirring during 30 min, after which the mixture was stirred for an additional 30 min, thus affording an aluminosililcate gel with a molar ratio of 40.28 $SiO_2$:1.00 $Al_2O_3$:13.06 $Na_2O$:1132.32 $H_2O$. The gel mixture was then transferred into a Teflon®-lined autoclave and crystallized at 140° C. for 48 h. After having let the reaction mixture cool to room temperature, it was filtered, repeatedly washed with distilled water, and then dried at 120° C. for 16 h, thus affording 5.9 g of a white crystalline product.

Electron Probe Micro Analysis of the crystalline product of Example 11A via Energy Dispersive X-Ray Spectroscopy (EDXS) afforded an $SiO_2$:$Al_2O_3$ molar ratio of 10.1.

Figure 11A:
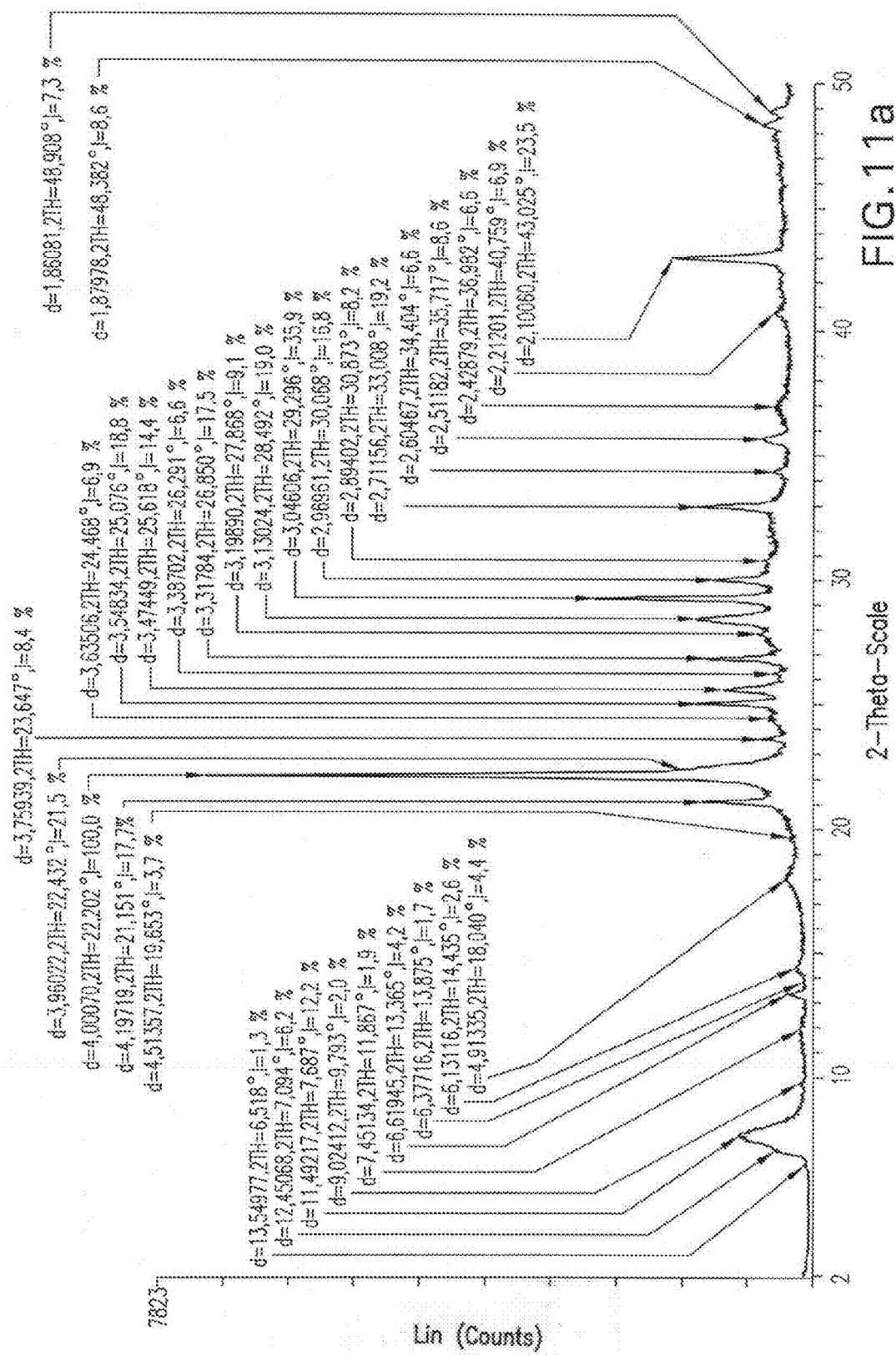

In FIG. 11a, the XRD of the crystalline product obtained according to Example 11A is displayed, including the 2 Theta values and respective intensities for the individual reflections. Additional weak reflections stemming from mordenite side-product are visible in the powder-diffraction pattern.

Figure 11B:
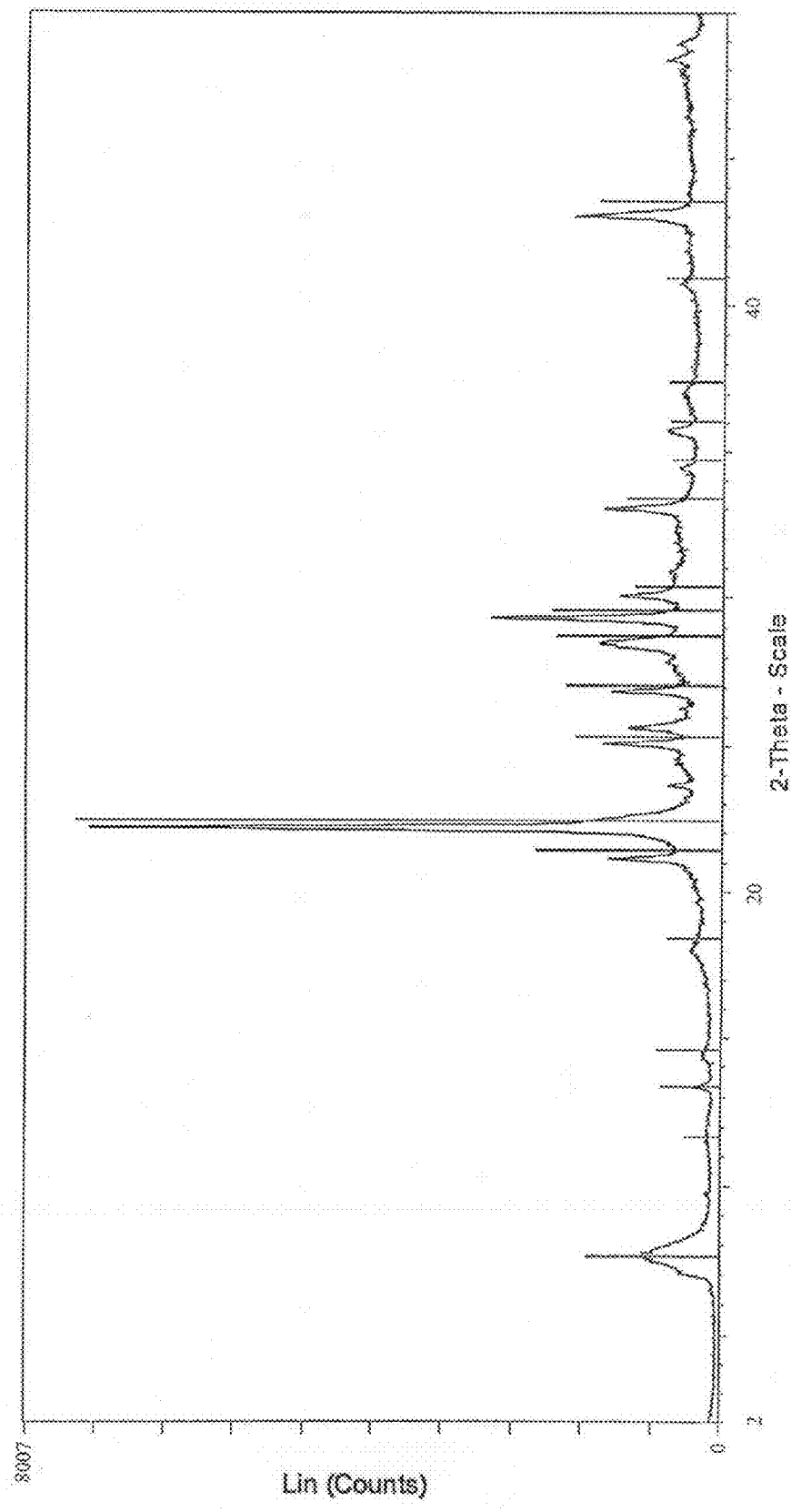
FIG. 11b shows the X-ray diffraction pattern of the crystalline material obtained from Example 11A together with the line pattern of zeolite Beta obtained from template mediated synthesis.

In FIG. 11b, the XRD pattern of Example 11A is displayed together with the line pattern of zeolite Beta as synthesized with an organic template as the structure directing agent. In particular, it is apparent that the reflections of the zeolitic material obtained by organotemplate-free synthesis according to the present invention are noticeably shifted towards smaller 2 Theta values compared to the reflections of zeolite Beta obtained using an organic template.

FIG. 11c displays the $^{27}$Al MAS NMR obtained for the crystalline final product of Example 11A, displaying a single signal at 53.1 ppm. This indicates that the Al is entirely incorporated into the zeolite framework.

Figure 11D:
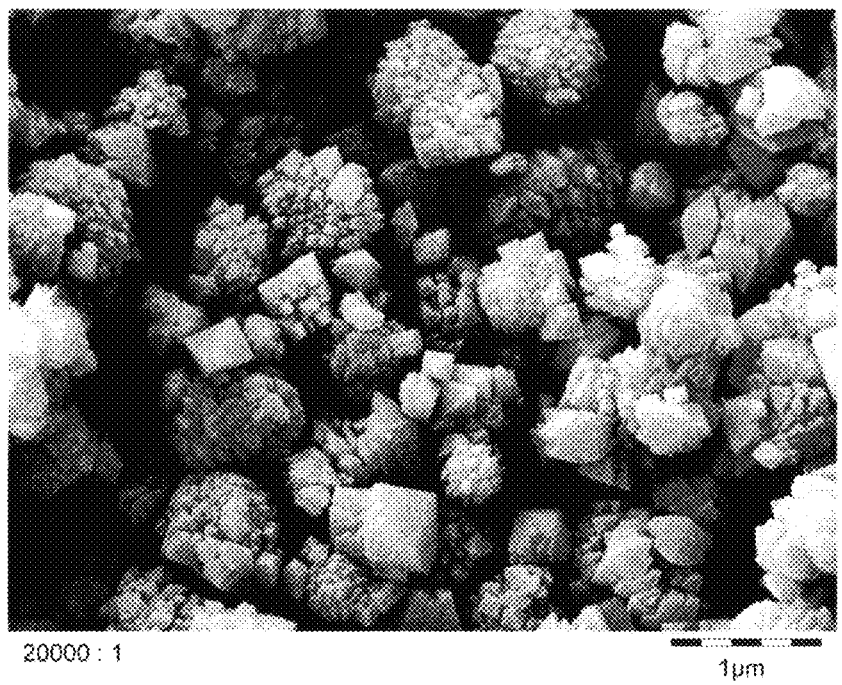

FIG. 11d shows a SEM-image of the crystalline product obtained according to Example 11A.

Figure 11E:
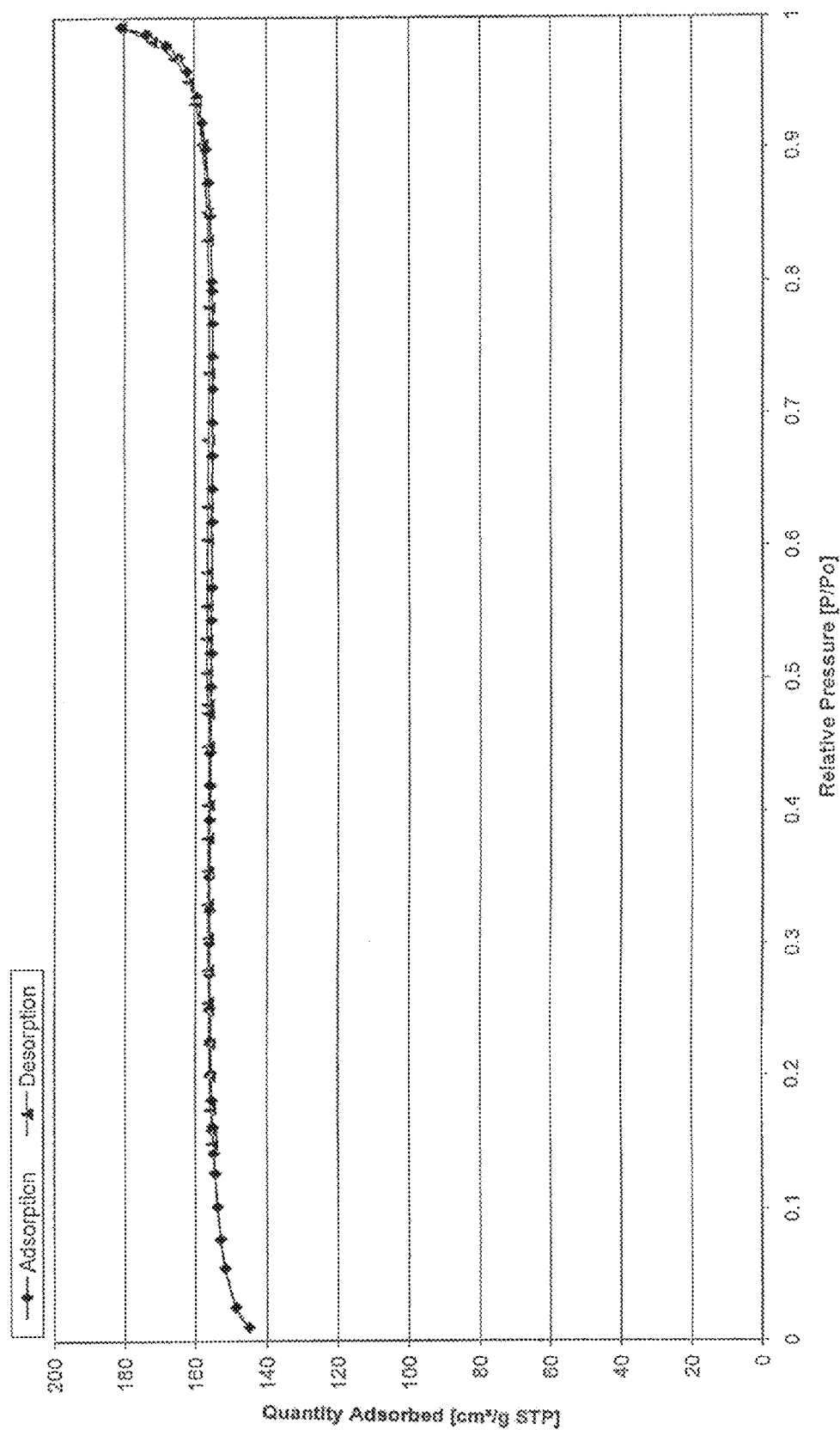

In FIG. 11e, the nitrogen isotherm obtained using the crystalline product of Example 11A is shown. In particular, the step-like curve of a type I adsorption isotherm typical of microporous solids is evident (cf. DIN 66135), indicating that the as-synthesized zeolitic material has open micropores. The evaluation of the data gave an equivalent surface of 684.45 m$^2$/g according to the Langmuir method, and a BET surface area of 523.08 m$^2$/g.

Example 11B

Ion-Exchange 1.34 g of NaAlO$_2$ and 6.54 g of NaOH were dissolved in 142.23 ml of H$_2$O while stirring, followed by addition of 1.69 g of zeolite Beta seeds (comercially obtained from Zeolyst International). 16.87 g of fumed silica (Aerosil® 200) was then added to the mixture in portions while stirring during 30 min, after which the mixture was stirred for an additional 30 min, thus affording an aluminosililcate gel with a molar ratio of 40.28 SiO$_2$:1.00 Al$_2$O$_3$:13.06 Na$_2$O:1132.32 H$_2$O. The gel mixture was then crystallized in an autoclave at 140° C. for 48 h. After having let the reaction mixture cool to room temperature, it was filtered, repeatedly washed with distilled water, and then dried at 120° C. for 16 h, thus affording 5.7 g of a white crystalline product.

Elemental analysis of the crystalline product of said first crystalline product afforded Na:SiO$_2$:Al$_2$O$_3$ molar ratios of 2.8:11.7:1.

4.0 g of the crystalline product were then added to a solution of 4 g of NH$_4$NO$_3$ dissolved in 36 g of distilled water and the mixture was stirred for 2 h at 80° C. The solid was then filtered and washed with distilled water, after which the solid was added to a new solution of 4 g of NH$_4$NO$_3$ dissolved in 36 g of distilled water and the mixture then stirred for 2 h at 80° C. After filtering and washing the solid with distilled water, the resulting product was then dried for 16 h at 120° C., to afford the ion-exchanged crystalline product.

Elemental analysis of the final crystalline product of Example 11B afforded an Na:Al$_2$O$_3$ molar ratio of 0.13.

Example 12

18.9 g of NaAlO$_2$ were dissolved in 701 ml of H$_2$O. 610.9 g of sodium-water glass and 47.5 g of zeolite Beta seeds (comercially obtained from Zeolyst International) were then added, thus affording an aluminosililcate gel with a molar ratio of 40.28 SiO$_2$:1.50 Al$_2$O$_3$:14.0 Na$_2$O:936H$_2$O. The resulting mixture was then heated in a 2.5 l autoclave while stirring with a heat ramp of 40° C./h to 140° C. and held at that temperature for 15 hours. The crystallized product was then suction filtered and repeatedly washed distilled water. The crystalline solid was then dried at 120° C. for 16 h, thus affording 96 g of a white crystalline product.

Elemental analysis of the crystalline product of Example 12 afforded Na:SiO$_2$:Al$_2$O$_3$ molar ratios of 2.4:11.0:1.

Figure 12:
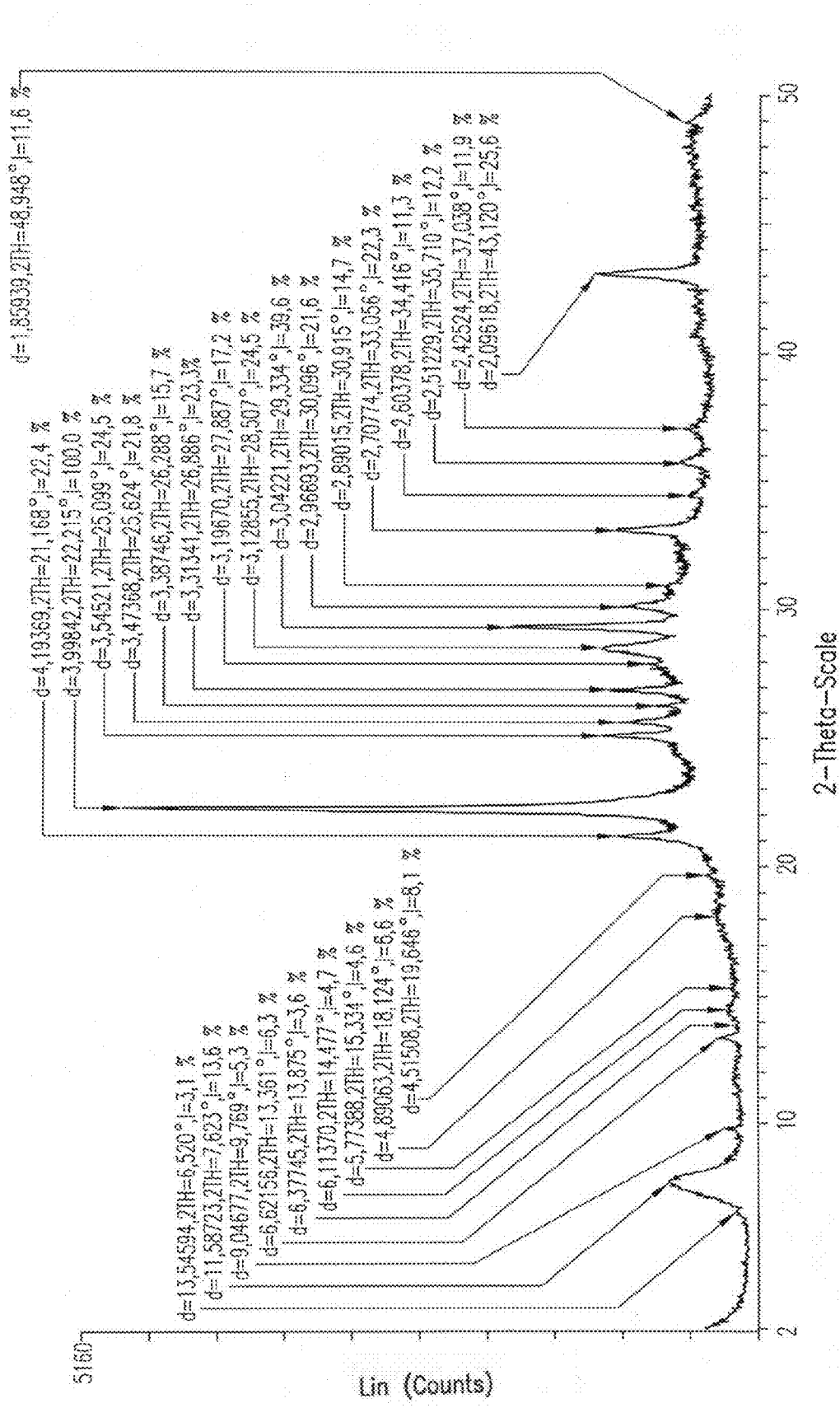

In FIG. 12, the XRD of the crystalline product of Example 12 is displayed, including the 2 Theta values and respective intensities for the individual reflections. Additional weak reflections stemming from mordenite side-product are visible in the powder-diffraction pattern.

Thus, by using sodium-water glass instead of fumed silica, the crystallization time may be considerably reduced.

Example 13

0.474 kg of NaAlO$_2$ were dissolved while stirring in 15 l of H$_2$O. 15.27 kg of sodium-water glass and 1.17 kg of zeolite Beta seeds (comercially obtained from Zeolyst International) suspended in 2.53 l H$_2$O were then added, thus affording an aluminosililcate gel with a molar ratio of 40.28 SiO$_2$:1.50 Al$_2$O$_3$:14.01 Na$_2$O:936.6 H$_2$O. The resulting mixture was then heated in an autoclave while stirring (at about 150 rpm) with a heat ramp of 36° C./h to 140° C. and held at that temperature for 15 hours. The crystallized product was then pressure filtered and washed three times with 35 l of distilled water, respectively. The crystalline solid was then dried at 100° C. for 2 d, thus affording 1.1 kg of a white crystalline product.

Elemental analysis of the crystalline product of Example 13 afforded Na:SiO$_2$:Al$_2$O$_3$ molar ratios of 3.53:12.1:1.

Figure 13A:
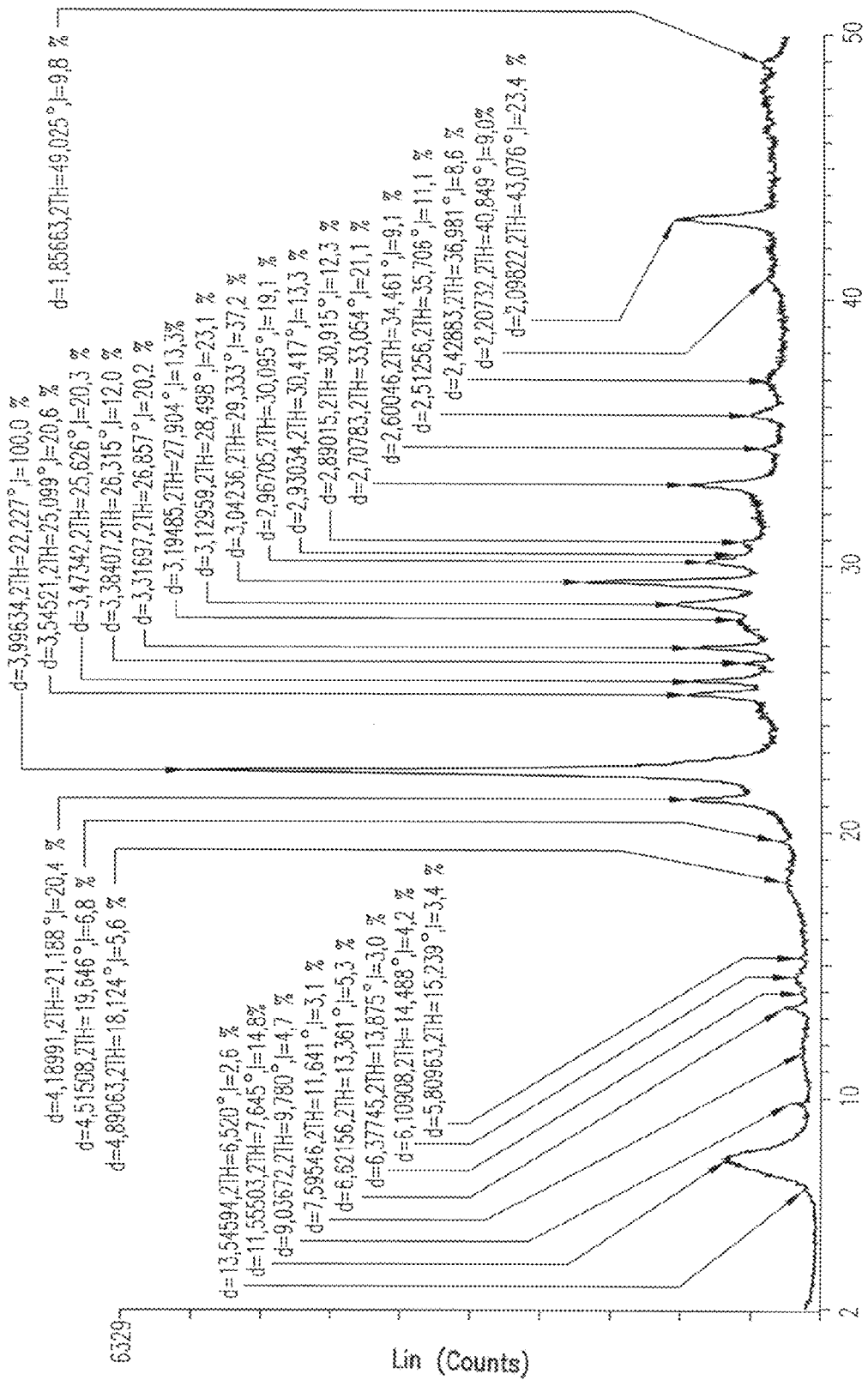

In FIG. 13a, the XRD of the crystalline product of Example 13 is displayed, including the 2 Theta values and respective intensities for the individual reflections. Additional weak reflections stemming from mordenite side-product are visible in the powder-diffraction pattern.

Figure 13B:
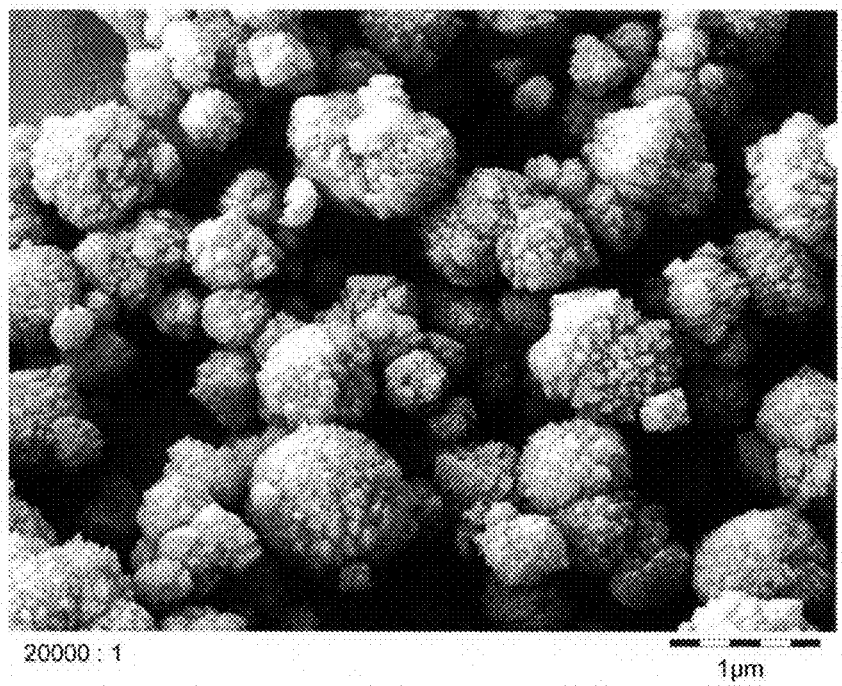
Figure 13C:
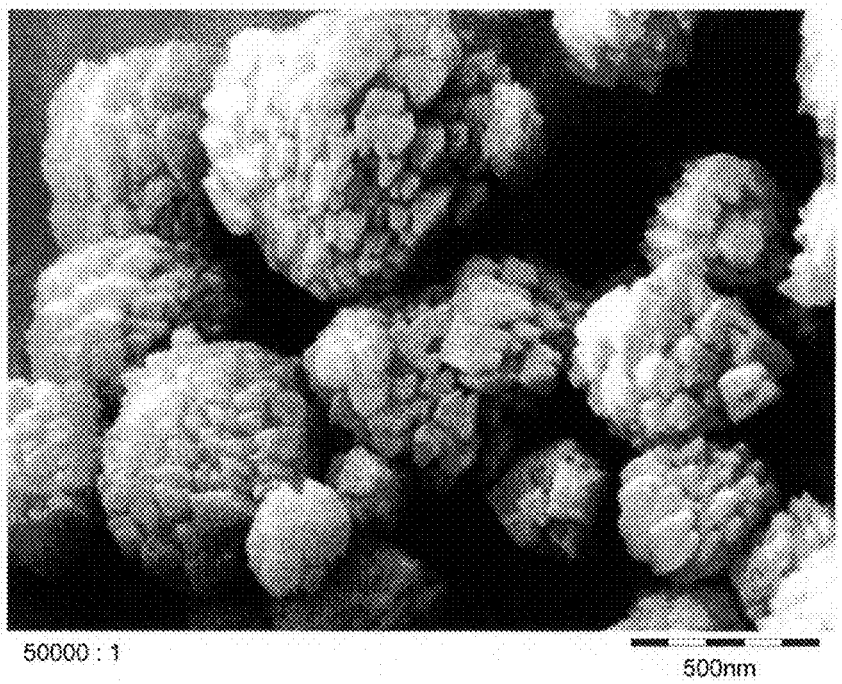

FIGS. 13b and 13c display SEM-images of the crystalline product of Example 13.

Example 14

19.1 g of NaAlO$_2$ were dissolved in 706.5 ml of H$_2$O. 923.6 g of sodium-water glass and 48.0 g of zeolite Beta seeds (comercially obtained from Zeolyst International) were then added, thus affording an aluminosililcate gel with a molar ratio of 40.28 SiO$_2$:1.0 Al$_2$O$_3$:13.34 Na$_2$O:734H$_2$O. The resulting mixture was then heated in a 2.5 l autoclave while stirring with a heat ramp of 40° C./h to 120° C. and held at that temperature for 57 hours. The crystallized product was then suction filtered and repeatedly washed distilled water. The crystalline solid was then dried at 120° C. for 16 h, thus affording 85 g of a white crystalline product.

Figure 14:
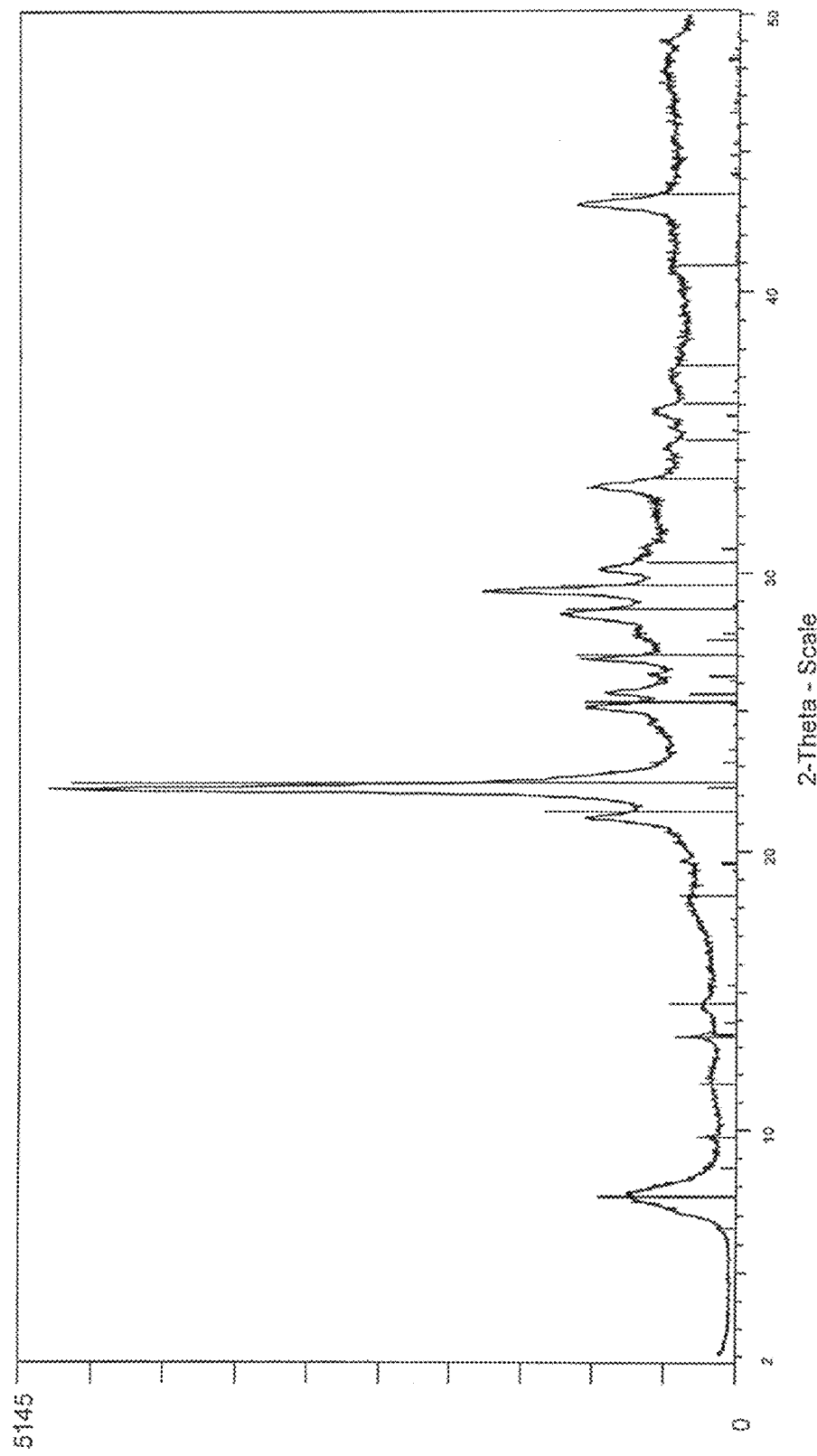

In FIG. 14, the XRD of the crystalline product of Example 14 displayed together with both the line pattern of zeolite Beta as synthesized with an organic template as the structure directing agent, and the line pattern of mordenite.

Example 15

Isomorphous Substitution with Fe 1.34 g of NaAlO$_2$ and 6.54 g of NaOH were dissolved in 142.23 ml of H$_2$O, followed by addition of 1.69 g of zeolite Beta seeds (comercially obtained from Zeolyst International) and 1.35 g Fe$_3$(NO$_3$)$_3$.9H$_2$O. 16.87 g of fumed silica (Aerosil® 200) was then added to the mixture in portions while stirring during 30 min, after which the mixture was stirred for an additional 30 min, thus affording an aluminosililcate gel with a molar ratio of 40.28 $SiO_2$:1.00 $Al_2O_3$:13.06 $Na_2O$:0.5 Fe:1132.32 $H_2O$. The gel mixture was then transferred into a Teflon®-lined autoclave and crystallized at 140° C. for 48 h. After having let the reaction mixture cool to room temperature, it was filtered, repeatedly washed with distilled water, and then dried at 120° C. for 16 h, thus affording a crystalline product.

Electron Probe Micro Analysis of the crystalline product of Example 15 via Energy Dispersive X-Ray Spectroscopy (EDXS) afforded Na $SiO_2$:$Al_2O_3$ molar ratios of 3.3:12.0:1 and an $SiO_2$:Fe molar ratio of 30.7.

In FIG. 15a, the XRD of the crystalline product of Example 15 is displayed, including the 2 Theta values and respective intensities for the individual reflections. Additional weak reflections stemming from mordenite side-product are visible in the powder-diffraction pattern.

Figure 15B:
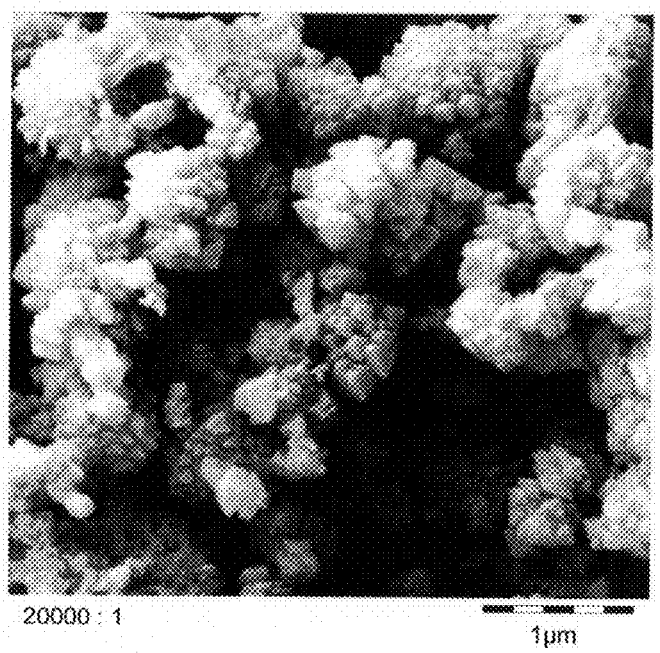
Figure 15C:
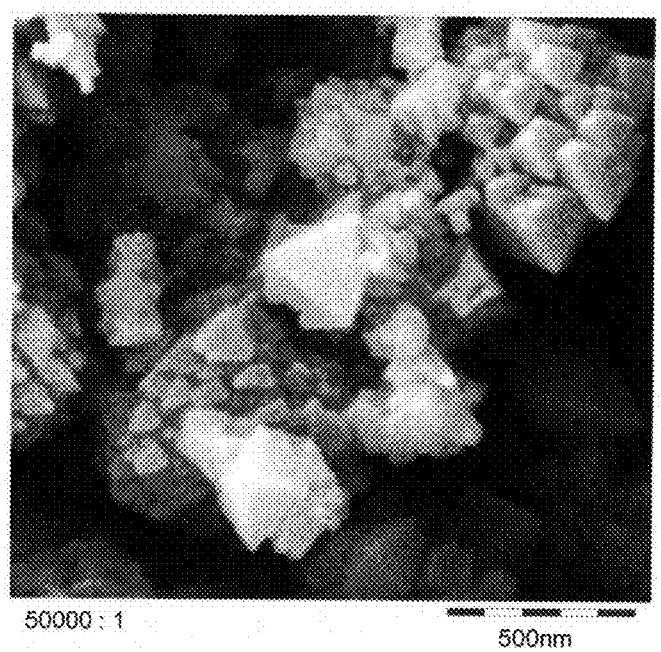

FIGS. 15b and 15c display SEM-images of the crystalline product obtained according to Example 15.

We claim:

1. An organotemplate-free synthetic process for the production of a zeolitic material having a BEA framework structure comprising $YO_2$ and $X_2O_3$, wherein said process comprises
   (1) preparing a mixture comprising seed crystals, at least one source for $YO_2$, and at least one source of $X_2O_3$;
   (2) crystallizing the mixture; and
   (6) subjecting said zeolitic material having a BEA framework structure to an ion-exchange procedure,
   wherein Y is a tetravalent element, and X is a trivalent element,
   wherein the seed crystals comprise zeolitic material having a BEA framework structure, and
      wherein in step (6) at least one ionic non-framework element contained in said zeolitic material having a BEA framework is ion-exchanged against Fe and/or Cu.

2. The process according to claim 1, wherein Y is Si.

3. The process according to claim 1, wherein the at least one source for $YO_2$ comprises at least one silicate.

4. The process according to claim 1, wherein X is Al.

5. The process according to claim 1, wherein the at least one source for $X_2O_3$ comprises at least one aluminate salt.

6. The process according to claim 5, wherein the at least one source for $X_2O_3$ comprises sodium and/or potassium aluminate.

7. The process according to claim 1, wherein the mixture according to step (1) further comprises a solvent.

8. The process according to claim 1, wherein the mixture according to step (1) further comprises at least one source for $OH^-$.

9. The process according to claim 1, wherein the crystallization in step (2) involves heating of the mixture.

10. The process according to claim 1 further comprising at least one of the following
   (3) isolating the zeolitic material having a BEA framework structure, and/or
   (4) washing the zeolitic material having a BEA framework structure, and/or
   (5) drying the zeolitic material having a BEA framework structure,
   wherein the steps (3) and/or (4) and/or (5) and/or (6) can be conducted in any order.

11. The process according to claim 1, wherein the zeolitic material having a BEA framework structure formed in step (2) comprises zeolite Beta.

12. The process according to claim 1, wherein the seed crystals comprise a zeolitic material having a BEA framework structure as synthesized according to the process of claim 1.

13. The process according to claim 1, wherein the organotemplate-free synthesis does not comprise a calcination step.

14. An organotemplate-free zeolitic material having a BEA framework structure obtainable and/or obtained according to claim 1.

15. An organotemplate-free zeolitic material having a BEA framework structure, having an X-ray diffraction pattern comprising at least the following reflections:

| Intensity (%) | Diffraction angle 2θ/° [Cu K(alpha 1)] |
|---|---|
| [12-32] | [21.07-21.27] |
| 100 | [22.12-22.32] |
| [14-34] | [25.01-25.21] |
| [12-32] | [26.78-26.98] |
| [14-34] | [28.39-28.59] |
| [28-48] | [29.24-29.44] |
| [10-30] | [30.00-30.20] |
| [11-31] | [32.86-33.26] |
| [13-33] | [42.90-43.30] | wherein 100% relates to the intensity of the maximum peak in the X-ray powder diffraction pattern,
wherein the BEA framework structure comprises $YO_2$ and optionally comprises $X_2O_3$,
wherein Y is a tetravalent element, and X is a trivalent element,
wherein the zeolitic material comprises at least one alkali metal M, wherein at least a portion of said alkali metal atoms M is substituted by Fe and/or Cu.

16. The organotemplate-free zeolitic material according to claim 15, wherein the X-ray diffraction pattern comprises the following reflection:

| Intensity (%) | Diffraction angle 2θ/° [Cu K(alpha 1)] |
|---|---|
| [11-31] | [25.53-25.73] |

17. The organotemplate-free zeolitic material according to claim 15, wherein Y is Si.

18. The organotemplate-free zeolitic material according to claim 15, wherein X is Al.

19. The organotemplate-free zeolitic material according to claim 15, wherein said material comprises at least sodium and/or potassium.

20. The organotemplate-free zeolitic material according to claim 15, wherein said material comprises zeolite Beta.

21. A method of using an organotemplate-free zeolitic material according to claim 15 in a catalytic process.

22. The organotemplate-free zeolitic material according to claim 15, wherein said zeolitic material has a BEA framework structure comprising $YO_2$ and $X_2O_3$ and is obtainable and/or obtained by a process comprising
   (1) preparing a mixture comprising seed crystals, at least one source for $YO_2$ and at least one source of $X_2O_3$;
   (2) crystallizing the mixture; and
   (6) subjecting said zeolitic material having a BEA framework structure to an ion-exchange procedure,
   wherein Y is a tetravalent element, and X is a trivalent element, wherein the seed crystals comprise zeolitic material having a BEA framework structure, and wherein in step (6) at least one ionic non-framework element contained in said zeolitic material having a BEA framework is ion-exchanged against Fe and/or Cu.

* * * * *